(12) United States Patent
Song et al.

(10) Patent No.: US 8,098,355 B2
(45) Date of Patent: Jan. 17, 2012

(54) LIQUID CRYSTAL DISPLAY

(75) Inventors: Jang-Kun Song, Seoul (KR); Sahng-Ik Jun, Seoul (KR); Jae-Hong Jeon, Seongnam-si (KR); Jae-Ho Lee, Seoul (KR); Jeong-Young Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 23 days.

(21) Appl. No.: 12/274,591

(22) Filed: Nov. 20, 2008

(65) Prior Publication Data

US 2009/0096977 A1    Apr. 16, 2009

Related U.S. Application Data

(63) Continuation-in-part of application No. 11/697,984, filed on Apr. 9, 2007, now Pat. No. 7,456,921, which is a continuation of application No. 10/965,267, filed on Oct. 15, 2004, now Pat. No. 7,218,369.

(30) Foreign Application Priority Data

Oct. 15, 2003 (KR) .......................... 10-2003-0071707

(51) Int. Cl.
*G02F 1/1337* (2006.01)
(52) U.S. Cl. ........................................................ 349/129
(58) Field of Classification Search .................... 349/129
See application file for complete search history.

(56) References Cited

U.S. PATENT DOCUMENTS

| | | | |
|---|---|---|---|
| 6,567,144 B1 * | 5/2003 | Kim et al. ...................... | 349/128 |
| 6,577,366 B1 | 6/2003 | Kim et al. | |
| 6,760,087 B2 | 7/2004 | Wu et al. | |
| 7,283,190 B2 | 10/2007 | Sasaki et al. | |
| 2001/0019392 A1 | 9/2001 | Sakamoto et al. | |
| 2002/0036740 A1 | 3/2002 | Kubo et al. | |
| 2002/0131002 A1 * | 9/2002 | Tanaka et al. ................. | 349/139 |
| 2003/0058394 A1 | 3/2003 | Wu et al. | |
| 2003/0202146 A1 * | 10/2003 | Takeda et al. ................. | 349/129 |
| 2004/0119924 A1 | 6/2004 | Takeda et al. | |

FOREIGN PATENT DOCUMENTS

| | | |
|---|---|---|
| JP | 10333170 A | 12/1998 |
| JP | 2000-155317 | 6/2000 |
| JP | 2001-109019 | 4/2001 |
| JP | 2001109009 A | 4/2001 |
| JP | 2003-084266 | 3/2003 |
| JP | 2003140188 A | 5/2003 |
| KR | 10-1999-006951 | 1/1999 |
| KR | 10-2000-0057973 A | 9/2000 |
| KR | 10-2000-0073730 A | 12/2000 |
| TW | 200300036 A | 5/2003 |
| TW | 536653 B | 6/2003 |

* cited by examiner

*Primary Examiner* — Phu Vu
(74) *Attorney, Agent, or Firm* — Innovation Counsel LLP

(57) ABSTRACT

A liquid crystal display is provided, which includes: a first substrate; a first signal line formed on the first substrate; a second signal line formed on the first substrate and intersecting the first signal line; a thin film transistor connected to the first and the second signal lines; a pixel electrode connected to the thin film transistor; a second substrate; a common electrode formed on the second substrate; a liquid crystal layer interposed between the first substrate and the second substrate; and a tilt direction determining member formed on one of the first and the second substrates and having a notch that divides the domain determination member into a plurality of portions.

20 Claims, 20 Drawing Sheets

LIQUID CRYSTAL DISPLAY

CROSS-REFERENCE TO RELATED APPLICATION

This application is a continuation-in-part of U.S. patent application Ser. No. 11/697,984, filed on Apr. 9, 2007, now U.S. Pat. No. 7,456,921, which is a continuation application of Ser. No. 10/965,267, filed on Oct. 15, 2004, now U.S. Pat. No. 7,218,369, which claims priority to and the benefit of Korean Patent Application No. 10-2003-0071707 filed on Oct. 15, 2003, and are incorporated herein by reference in their entirety.

BACKGROUND OF THE INVENTION (a) Field of the Invention

The present invention relates to a liquid crystal display.

(b) Description of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertical alignment (VA) mode LCD, which aligns LC molecules such that the long axes of the LC molecules are perpendicular to the panels in absence of electric field, is spotlighted because of its high contrast ratio and wide reference viewing angle that is defined as a viewing angle making the contrast ratio equal to 1:10 or as a limit angle for the inversion in luminance between the grays.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the reference viewing angle is widened.

However, the cutouts and the protrusions may yield spots or afterimages and the spots generated by scrubbing the LCD are remained. It is because the tilt directions of the liquid crystal molecules near the cutouts and the protrusions are determined by push of the liquid crystal molecules on the field-generating electrodes or by collision with them and thus the alignment of the liquid crystal molecules is unstable and irregular.

SUMMARY OF THE INVENTION

A liquid crystal display according to an exemplary embodiment of the present invention includes: a first substrate; a first signal line formed on the first substrate; a second signal line formed on the first substrate and intersecting the first signal line; a pixel electrode formed in a pixel defined by the intersection of the first signal line and the second signal line; a thin film transistor connected to the first signal line, the second signal line, and the pixel electrode; a second insulating substrate facing the first insulating substrate; a common electrode formed on the second insulation substrate; a liquid crystal layer formed between the first insulation substrate and the second insulation substrate; and domain determination member formed on at least one of the first insulating substrate and the second insulating substrate and dividing the liquid crystal molecules of the liquid crystal layer in the pixel into a plurality of domains, wherein the domain determination member is divided into a plurality of portions by a notch.

The second signal line may include a curved portion, and the curved portion of the second signal line may include a first straight portion and a second straight portion, the first straight portion may be inclined at a positive acute angle from the first signal line, and the second straight portion may be inclined at a negative acute angle from the first signal line.

The first straight portion may be inclined at an angle of substantially 45 degrees from the first signal line, and the second straight portion may be inclined at an angle of substantially −45 degrees from the first signal line.

The domain determination mean may include a portion protruding in a direction parallel to the first signal line.

The notch may divide the oblique portion of the domain determination member.

The liquid crystal display may further include a light blocking member formed on one of the first insulating substrate and the second insulating substrate, and overlapping the oblique portion of the domain determination member.

The oblique portion of the domain determination member may be disposed at a position dividing the pixel electrode into two equal parts.

The liquid crystal display may further include a storage electrode wiring set formed according to the circumference of the pixel area defined by the intersection of the first signal line and the second signal line.

The domain determination member may be a cutout formed in the common electrode or the pixel electrode.

The domain determination member may be a protrusion formed on the common electrode or the pixel electrode.

The notch may be a cutout formed in the pixel electrode, or an organic protrusion formed on the pixel electrode.

The liquid crystal display may further include a color filter formed on the first substrate.

A liquid crystal display according to another exemplary embodiment of the present invention includes: a first substrate; a first signal line formed on the first substrate; a second signal line formed on the first substrate and intersecting the first signal line; a thin film transistor connected to the first signal line and the second signal line; a pixel electrode connected to the thin film transistor; a second insulating substrate facing the first insulating substrate; a common electrode formed on the second insulation substrate; a liquid crystal layer formed between the first insulation substrate and the second insulation substrate; and domain determination member formed on at least one of the first insulating substrate and the second insulating substrate and dividing liquid crystal molecules of the liquid crystal layer in the pixel into a plurality of domains, wherein the domain determination member includes protrusions and depressions.

The second signal line may include a curved portion, wherein the curved portion of the second signal line may include a first straight portion and a second straight portion, the first straight portion may be inclined at a positive acute angle from the first signal line and the second straight portion may be inclined at a negative acute angle from the first signal line, and the domain determination member may include an oblique portion formed on the second insulation substrate and parallel to the curved portion of the second signal line.

The first straight portion may be inclined at an angle of substantially 45 degrees from the first signal line, and the second straight portion may be inclined at an angle of substantially −45 degrees from the first signal line.

The domain determination mean may include a portion protruding in a direction parallel to the first signal line.

The protrusions and depressions may be included to the oblique portion.

The protrusions and depressions may be intermittently formed in the oblique portion.

The domain determination member may be a cutout of the common electrode or the pixel electrode.

A liquid crystal display according to another exemplary embodiment of the present invention includes: a first substrate; a first signal line formed on the first substrate; a second signal line formed on the first substrate and intersecting the first signal line; a pixel electrode formed in the pixel defined by the intersection of the first signal line and the second signal line; a thin film transistor connected to the first signal line, the second signal line, and the pixel electrode; a second insulating substrate facing the first insulating substrate; a common electrode formed on the second insulation substrate; a liquid crystal layer formed between the first insulation substrate and the second insulation substrate; and domain determination member formed on at least one of the first insulating substrate and the second insulating substrate and dividing liquid crystal molecules of the liquid crystal layer in the pixel into a plurality of domains, wherein the second signal line includes a curved portion, and the curved portion of the second signal line includes at least two straight portions, the straight portion is inclined from the first signal line, the domain determination member includes an oblique portion formed on the second insulation substrate and parallel to the curved portion of the second signal line, and the oblique portion includes a plurality of protrusions and depressions.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
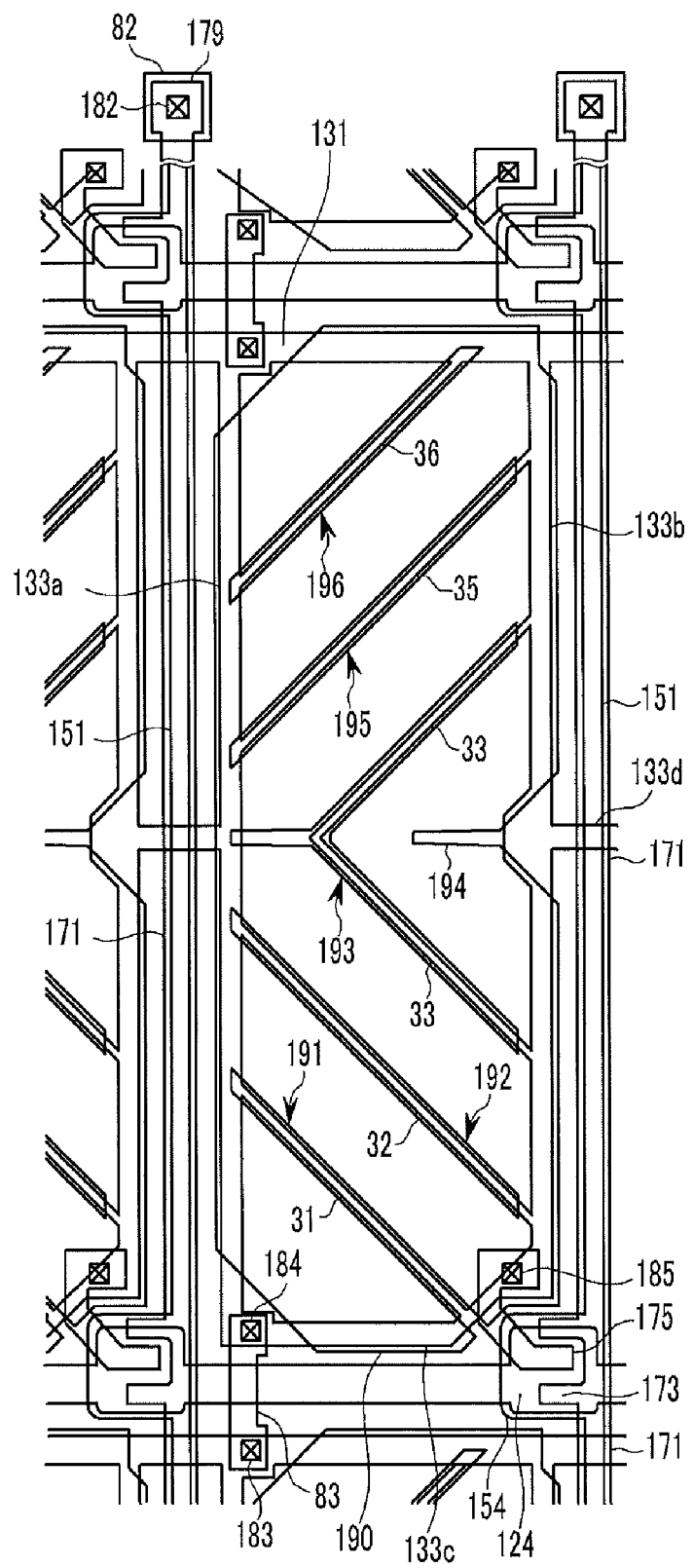
FIG. 1 is a layout view of a TFT array panel of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays and thin film transistor (TFT) array panels for LCDs according to embodiments of the present invention will be described with reference to the accompanying drawings.

An LCD according to an embodiment of the present invention will be described in detail with reference to FIGS. 1-4.

Figure 2:
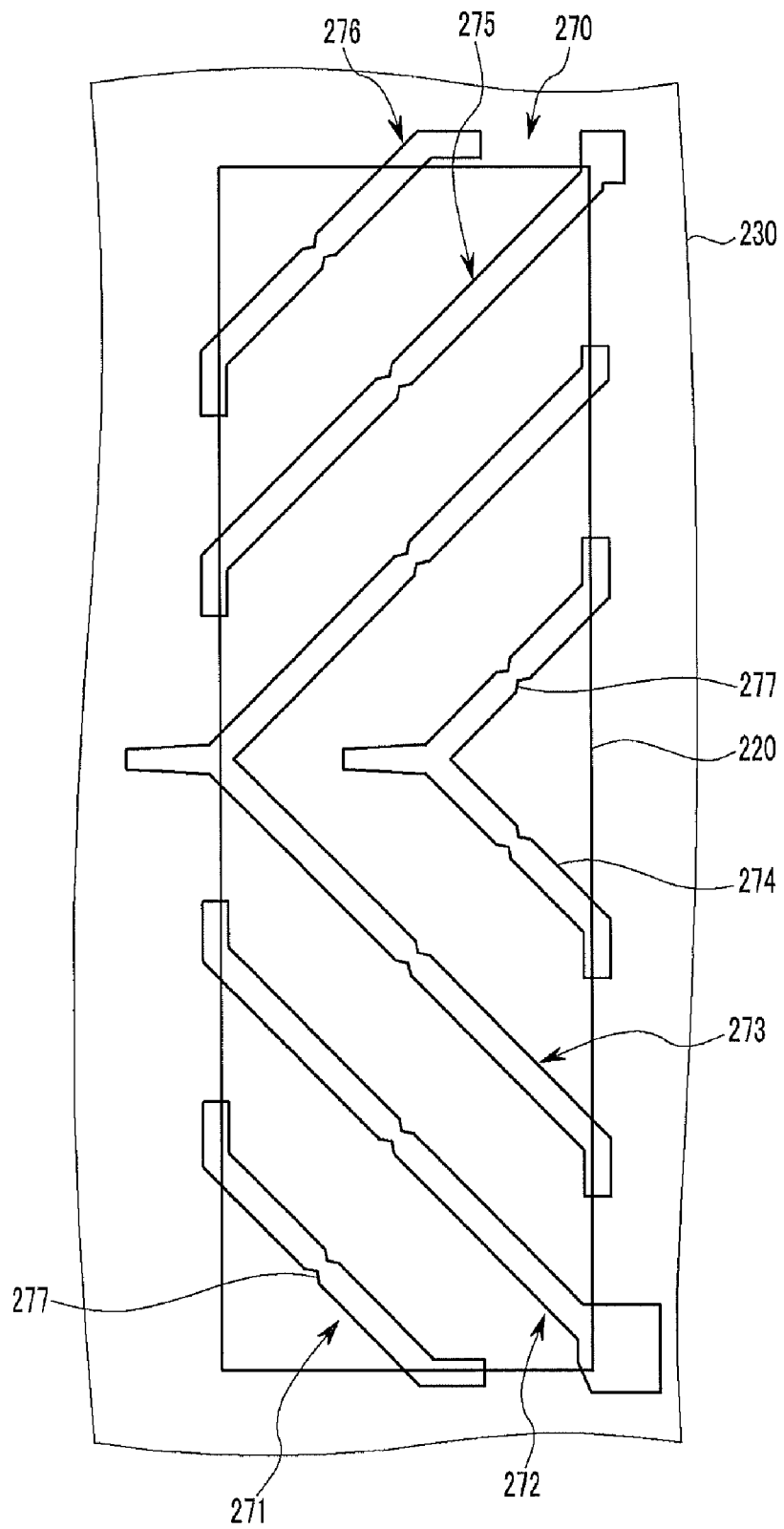
FIG. 2 is a layout view of a common electrode panel of an LCD according to an embodiment of the present invention.
Figure 3:
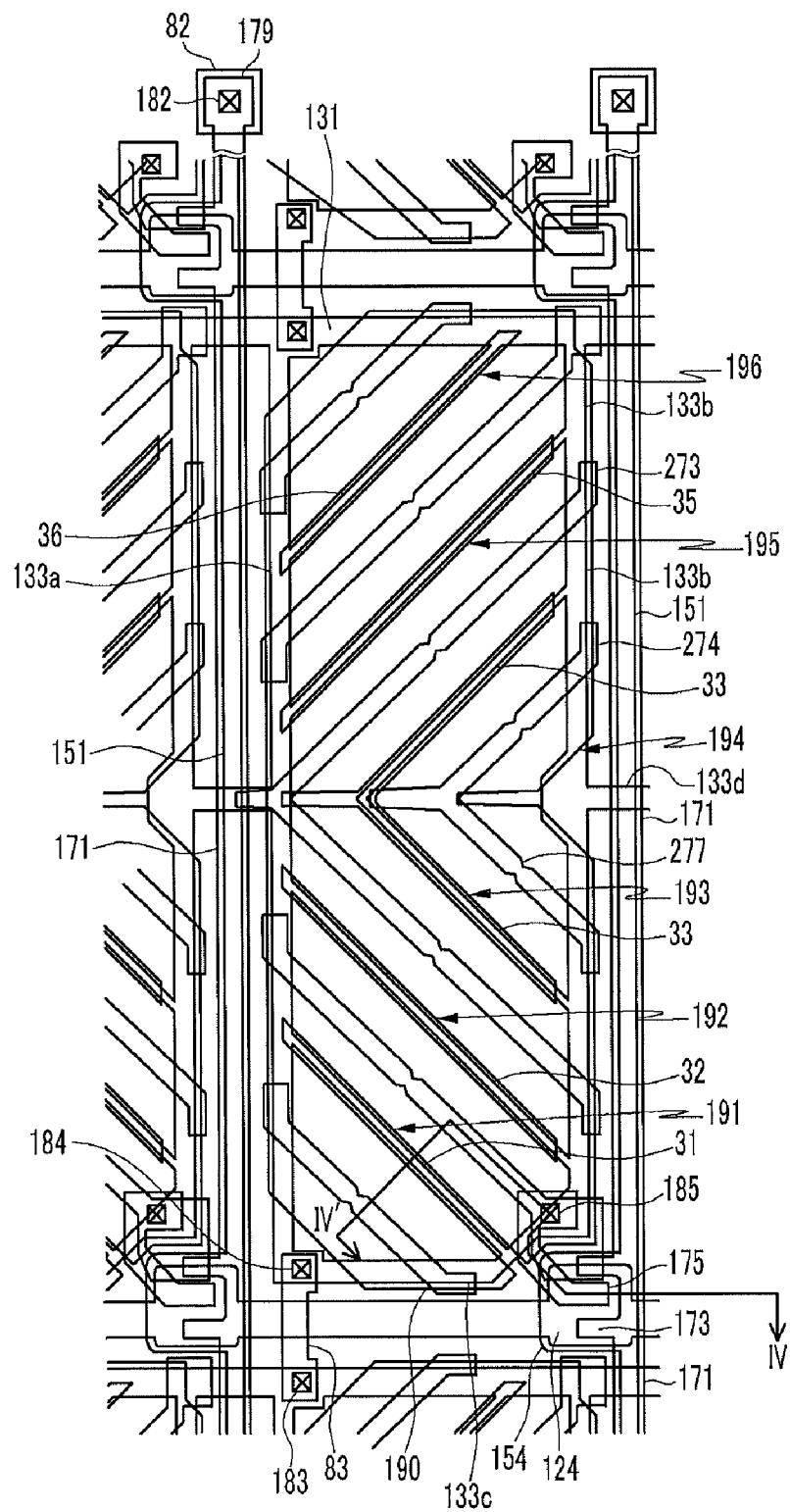
FIG. 3 is a layout view of an LCD including the TFT array panel shown in FIG. 1 and the common electrode panel shown in FIG. 2.
Figure 4:
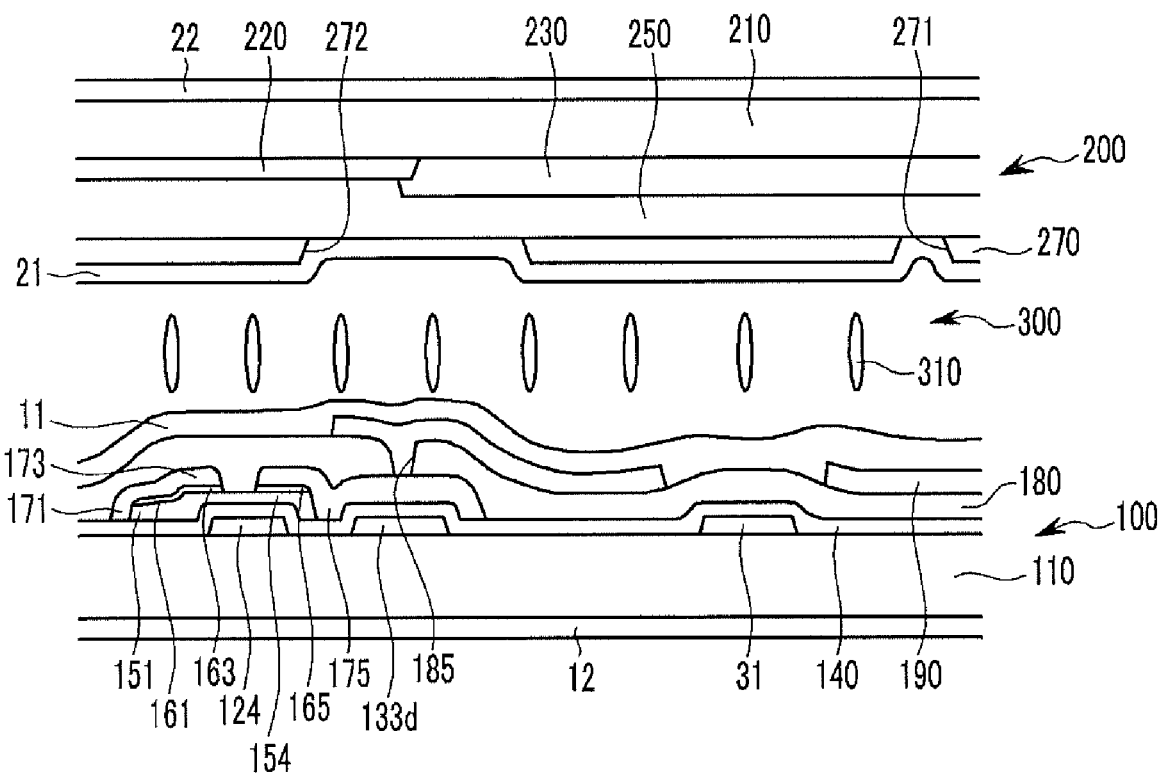
FIG. 4 is a sectional view of the LCD shown in FIG. 3 taken along the line IV-IV'.
Figure 5A:
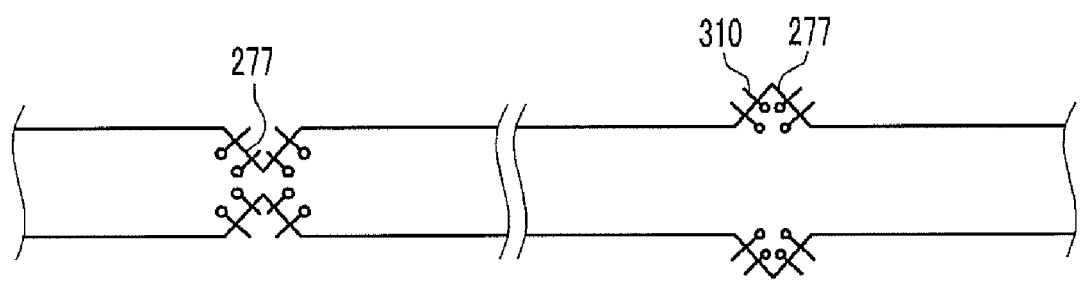
FIGS. 5A-5D illustrate various shapes of the notches shown in FIGS. 2 and 3.
Figure 5B:
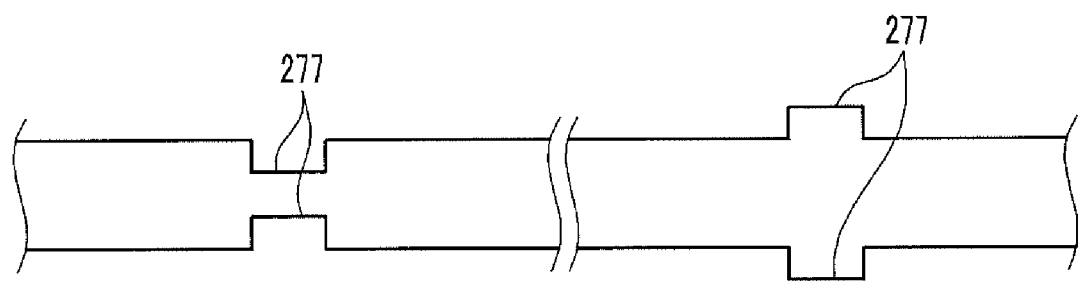
Figure 5C:
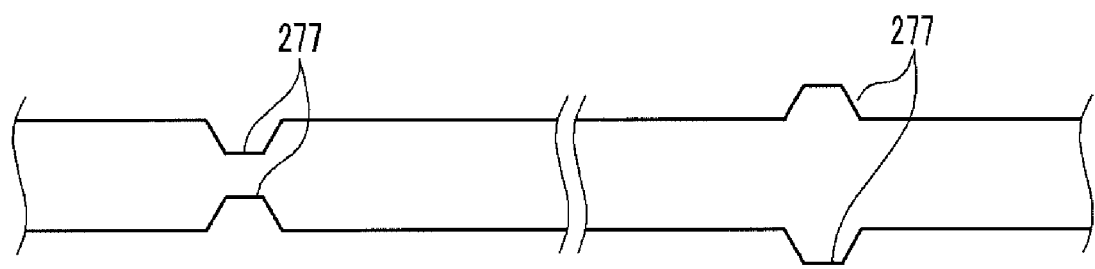
Figure 5D:
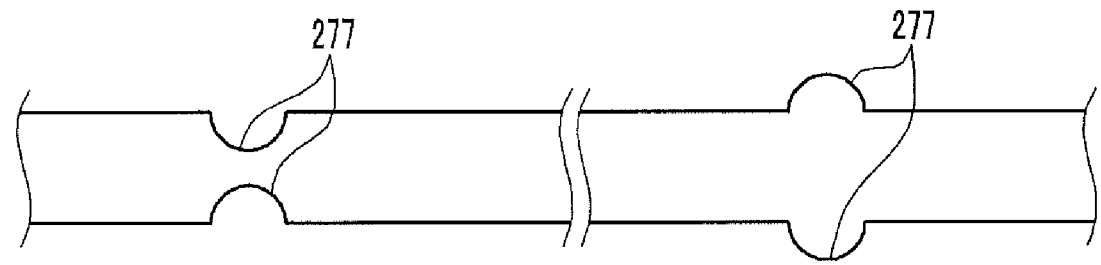

FIG. 1 is a layout view of a TFT array panel of an LCD according to an embodiment of the present invention, FIG. 2 is a layout view of a common electrode panel of an LCD according to an embodiment of the present invention, FIG. 3 is a layout view of an LCD including the TFT array panel shown in FIG. 1 and the common electrode panel shown in FIG. 2, and FIG. 4 is a sectional view of the LCD shown in FIG. 3 taken along the line IV-IV'.

An LCD according to an embodiment of the present invention includes a TFT array panel 100 including pixel electrodes 190, TFTs, and signal lines 121, 131 and 171, a common electrode panel 200 including a common electrode 190, and a LC layer 300 interposed between the panels 100 and 200 and containing a plurality of LC molecules 310.

The TFT array panel 100 is now described in detail with reference FIGS. 1, 3 and 4.

A plurality of gate lines 121 and a plurality of storage electrode lines 131 are formed on an insulating substrate 110 such as transparent glass.

The gate lines 121 transmitting gate signals extend substantially in a transverse direction and are separated from each other. Each gate line 121 includes a plurality of projections forming a plurality of gate electrodes 124 and it may include an end portion having a large area for connection with a driving circuit that may be integrated into the TFT array panel 100 or mounted on the TFT array panel 100 in a form of integrated circuit chip.

Each storage electrode line 131 extends substantially in the transverse direction and includes a plurality of sets of a ring-shaped branch 133a-133c and oblique branches 31-36 connected to the ring-shaped branch 133a-133c and a plurality of branch connections 133d connected between adjacent branches 133a-133c. Each branch set includes a pair of first and second storage electrodes 133a and 133b extending in a longitudinal direction and a third storage electrode 133c connected to ends of the first and the second storage electrodes 133a and 133b and extending in the transverse direction and in an oblique direction. The oblique branches 31, 32, 35, 36 are connected to two of the first to the third storage electrodes 133a-133c. The oblique branch 33 obliquely runs from the second storage electrode 133b to the first storage electrode 133a and changes its course near a center of the first storage electrode 133a to return to the second storage electrode 133b. The storage electrode lines 131 are supplied with a predetermined voltage such as a common voltage, which is applied to a common electrode 270 on the common electrode panel 200 of the LCD.

The gate lines 121 and the storage electrode lines 131 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta. The gate lines 121 and the storage electrode lines 131 may have a multi-layered structure including two films having different physical characteristics. One of the two films is preferably made of low resistivity metal including Al containing metal, Ag containing metal, and Cu containing metal for reducing signal delay or voltage drop in the gate lines 121 and the storage electrode lines 131. The other film is preferably made of material such as Cr, Mo and Mo alloy, Ta or Ti, which has good physical, chemical, and electrical contact characteristics with other materials such as indium tin oxide (ITO) or indium zinc oxide (IZO). Good examples of the combination of the two films are a lower Cr film and an upper Al—Nd alloy film and a lower Al film and an upper Mo film. The gate lines 121 and the storage electrode lines 131 may have a triple-layered structure including a lower Mo film, an intermediate Al film, and an upper Mo film.

In addition, the lateral sides of the gate lines 121 and the storage electrode lines 131 are inclined relative to a surface of the substrate, and the inclination angle thereof ranges about 30-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated to "a-Si") or polysilicon are formed on the gate insulating layer 140. Each semiconductor stripe 151 extends substantially in the longitudinal direction and has a plurality of projections 154 branched out toward the gate electrodes 124.

A plurality of ohmic contact stripes and islands 161 and 165 preferably made of silicide or n+ hydrogenated a-Si heavily doped with n type impurity such as phosphorous are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate, and the inclination angles thereof are preferably in a range between about 30-80 degrees.

A plurality of data lines 171 and a plurality of drain electrodes 175 separated from the data lines 171 are formed on the ohmic contacts 161 and 165 and the gate insulating layer 140.

The data lines 171 for transmitting data voltages extend substantially in the longitudinal direction and intersect the gate lines 121 and the storage electrode lines 131. In particular, the data lines 171 intersect the branch connections 133*d* such that each data line 171 is disposed between adjacent two of the ring-shaped branches 133*a*-133*c*. Each data line 171 includes an end portion 179 having a large area for contact with another layer or an external device. A plurality of branches of each data line 171, which project toward the gate electrodes 124, form a plurality of curved (like a crescent) source electrodes 173. Each drain electrode 175 includes an end portion having a large area for contact with another layer and another end portion partly enclosed by a source electrode 173. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The data lines 171 and the drain electrodes 175 are preferably made of refractory metal such as Cr, Mo, Ti, Ti, or alloys thereof and they may also have a multilayered structure including a lower film (not shown) preferably made of refractory metal and an upper film (not shown) located thereon and preferably made of low resistivity material such as Al containing metal. Alternatively, the data lines 171, etc., include triple layers interposing an intermediate layer of Al or Al alloy.

Like the gate lines 121 and the storage electrode lines 131, the data lines 171 and the drain electrodes 175 have tapered lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175.

A passivation layer 180 is formed on the data lines 171, the drain electrodes 175, and the exposed portions of the semiconductor stripes 151. The passivation layer 180 is preferably made of photosensitive organic material having a good flatness characteristic, low dielectric insulating material having dielectric constant lower than 4.0 such as a-Si:C:O and a-Si:O:F formed by plasma enhanced chemical vapor deposition (PECVD), or inorganic material such as silicon nitride. The passivation layer 180 may include a lower film of inorganic insulator and an upper film of organic insulator.

The passivation layer 180 has a plurality of contact holes 182 and 185 exposing the end portions 179 of the data lines 171 and the end portions of the drain electrodes 175, respectively. The passivation layer 180 and the gate insulating layer 140 have a plurality of contact holes 183 and 184 exposing upper left corners and lower left corners of the ring-type branches 133*a*-133*c*, respectively.

A plurality of pixel electrodes 190, a plurality of contact assistants 82, and a plurality of overpasses 83, which are preferably made of a transparent conductor such as ITO and IZO or a reflective conductor such as Al, are formed on the passivation layer 180.

The pixel electrodes 190 are physically and electrically connected to the drain electrodes 175 through the contact holes 185 such that the pixel electrodes 190 receive the data voltages from the drain electrodes 175.

The pixel electrodes 190 supplied with the data voltages generate electric fields in cooperation with the common electrode 270, which determine the orientations of LC molecules 310 in the LC layer 300.

A pixel electrode 190 and the common electrode 270 form a LC capacitor, which stores applied voltages after turn-off of the TFT. An additional capacitor called a "storage capacitor," which is connected in parallel to the LC capacitor, is provided for enhancing the voltage storing capacity. The storage capacitors are implemented by overlapping the pixel electrodes 190 with the storage electrode lines 131 including the storage electrodes 133*a* and 133*b*.

Each pixel electrode 190 is chamfered at its left corners and the chamfered edges of the pixel electrode 190 make an angle of about 45 degrees with the gate lines 121.

Each pixel electrode 190 has a plurality of lower cutouts 191 and 192, upper cutouts 195 and 196, and center cutouts 193 and 194, which partition the pixel electrode 190 into a plurality of partitions and overlap the oblique branches 31-36 of the storage electrode lines 131. The oblique branches 31-36 can control texture that may be occur at intermediate positions of the cutouts 191-196. The lower and the upper cutouts 191, 192, 195 and 196 are disposed at lower and upper halves of the pixel electrode 190, respectively, and the center cutouts 193 and 194 are located between the lower cutouts 191 and 192 and the upper cutouts 195 and 196. The cutouts 191-196 substantially have inversion symmetry with respect to an imaginary transverse center line bisecting the pixel electrode 190 into the upper and the lower halves.

The lower and the upper cutouts 191, 192, 195 and 196 make an angle of about 45 degrees to the gate lines 121, and the upper cutouts 195 and 196, which extend substantially parallel to each other and to the chamfered upper left edge of the pixel electrode 190, extend substantially perpendicular to the lower cutouts 191 and 192, which extend substantially parallel to each other.

The cutouts 191 and 196 extend approximately from a left longitudinal edge of the pixel electrode 190 approximately to transverse edges of the pixel electrode 190. The cutouts 192 and 195 extend approximately from the left edge of the pixel electrode 190 approximately to a longitudinal right edge of the pixel electrode 190.

The center cutout 193 includes a transverse portion extending approximately from the left edge of the pixel electrode 190 along the imaginary transverse line and a pair of oblique portions extending from the transverse portion to the right edge of the pixel electrode 190 and extending substantially parallel to the lower cutouts 191 and 192 and the upper cutouts 195 and 196, respectively. The center cutout 194 extends along the transverse center line of the pixel electrode 190 and has an inlet from the right edge of the pixel electrode 190, which has a pair of inclined edges substantially parallel to the lower cutouts 191 and 192 and the upper cutouts 195 and 196, respectively.

Accordingly, the lower half of the pixel electrode 190 is partitioned into four lower partitions by the lower cutouts 191 and 192 and the center cutout 193, and the upper half of the pixel electrode 190 is also partitioned into four upper partitions by the upper cutouts 195 and 196 and the center cutout 193. The number of partitions or the number of the cutouts is varied depending on the design factors such as the size of pixels, the ratio of the transverse edges and the longitudinal edges of the pixel electrodes 190, the type and characteristics of the LC layer 300, and so on.

The contact assistants 82 are connected to the end portions 179 of the data lines 171 through the contact holes 182. The contact assistants 82 protect the end portions 179 and complement the adhesion of the end portions 179 and external devices.

The overpasses 83 cross over the gate lines 121 and they are connected to the exposed portions of the storage electrode lines 131 through the contact holes 183 and 184 that are disposed opposite each other with respect to the gate lines 121. A plurality of metal pieces (not shown) may be disposed on the gate insulating layer 140 opposite the gate lines 121 and the overpasses 83 may overlap the metal pieces or may be electrically connected to the metal pieces. The storage electrode lines 131 including the storage electrodes 133a-133c along with the overpasses 83 and the metal pieces are used for repairing defects in the gate lines 121, the data lines 171, or the TFTs. The electrical connection between the gate lines 121 and the storage electrode lines 131 for repairing the gate lines 121 is obtained by illuminating the cross points of the gate lines 121 and the overpasses 83 by a laser beam to electrically connect the gate lines 121 to the overpasses 83. In this case, the metal pieces enhance the electrical connection between the gate lines 121 and the overpasses 83.

The description of the common electrode panel 200 follows with reference to FIGS. 2-4.

A light blocking member 220 called a black matrix for preventing light leakage is formed on an insulating substrate 210 such as transparent glass. The light blocking member 220 may include a plurality of openings that face the pixel electrodes 190 and it may have substantially the same shape as the pixel electrodes 190.

A plurality of color filters 230 are formed on the substrate 210 and they are disposed substantially in the areas enclosed by the light blocking member 220. The color filters 230 may extend substantially in the longitudinal direction along the pixel electrodes 190. Each of the color filters 230 may represent one of the primary colors such as red, green and blue colors.

An overcoat 250 for preventing the color filters 230 from being exposed and for providing a flat surface is formed on the color filters 230 and the light blocking member 220.

A common electrode 270 preferably made of transparent conductive material such as ITO and IZO is formed on the overcoat 250.

The common electrode 270 has a plurality of sets of cutouts 271-276 having pairs of notches 277, each pair of the notches facing each other.

A set of cutouts 271-276 face a pixel electrode 190 and include a plurality of lower and upper cutouts 271 and 272 and 275 and 276 and center cutouts 273 and 274. Each of the cutouts 271-276 is disposed between adjacent cutouts 191-196 of the pixel electrode 190 or between a cutout 196 and a chamfered edge of the pixel electrode 190. In addition, each of the cutouts 271-276 has at least an oblique portion extending parallel to the lower cutouts 191 and 192 or the upper cutouts 195 and 196 of the pixel electrode 190. The cutouts 271-276 substantially have inversion symmetry with respect to an imaginary transverse line bisecting the pixel electrode 190.

Each of the cutouts 271 and 276 has an oblique portion extending approximately from a left edge of the pixel electrode 190 approximately to a lower or upper edge of the pixel electrode 190 and transverse and longitudinal portions extending from respective ends of the oblique portion along edges of the pixel electrode 190, overlapping the edges of the pixel electrode 190, and making obtuse angles with the oblique portion.

Each of the cutouts 272 and 275 has an oblique portion, a longitudinal portion connected to an end of the oblique portion, and an expansion connected to the other end of the oblique portion. The oblique portion extends approximately from the left edge of the pixel electrode 190 approximately to lower right or upper right corner of the pixel electrode 190. The longitudinal portion extends from the end of the oblique portion along the left edge of the pixel electrode 190, overlaps the left edge of the pixel electrode 190, and makes an obtuse angle with the oblique portion. The expansion covers the respective corner of the pixel electrode 190.

The cutout 273 has a pair of oblique portions extending approximately from the center of the left edge of the pixel electrode 190 to the right edge of the pixel electrode 190, a transverse portion extending from a meeting point of the oblique portions to the left, and a pair of longitudinal portions extending from the respective oblique portions along the right edge of the pixel electrode 190, overlapping the right edge of the pixel electrode 190, and making an obtuse angle with the respective oblique portions. The cutout 274 has a transverse portion extending along the transverse center line of the pixel electrode 190, a pair of oblique portions extending from the transverse portion approximately to the right edge of the pixel electrode 190 and making obtuse angles with the transverse portion, and a pair of longitudinal portions extending from the respective oblique portions along the right edge of the pixel electrode 190, overlapping the right edge of the pixel electrode 190, and making an obtuse angle with the respective oblique portions.

The number of the cutouts 271-276 may be varied depending on the design factors, and the light blocking member 220 may also overlap the cutouts 271-276 to block the light leakage through the cutouts 271-276.

Alignment layers 11 and 21 that may be homeotropic are coated on inner surfaces of the panels 100 and 200, and polarizers 12 and 22 are provided on outer surfaces of the panels 100 and 200 such that their polarization axes may be crossed and one of the transmissive axes may be parallel to the gate lines 121. One of the polarizers may be omitted when the LCD is a reflective LCD.

The LCD may further include at least one retardation film for compensating the retardation of the LC layer 300.

It is preferable that the LC layer 300 has negative dielectric anisotropy and it is subjected to a vertical alignment that the LC molecules 310 in the LC layer 300 are aligned such that their long axes are substantially vertical to the surfaces of the panels 100 and 200 in absence of electric field.

As shown in FIG. 3, a set of the cutouts 191-196 and 271-276 divides a pixel electrode 190 into a plurality of sub-areas and each sub-area has two major edges.

The cutouts 91-96 and 271-276 as well as the trenches 186 control the tilt directions of the LC molecules 310 in the LC layer 300. This will be described in detail.

The cutouts 191-196 and 271-276 control the tilt directions of the LC molecules in the LC layer 3. This will be described in detail.

Upon application of the common voltage to the common electrode 270 and a data voltage to the pixel electrodes 190, an electric field substantially perpendicular to the surfaces of the panels 100 and 200 is generated. The LC molecules tend to change their orientations in response to the electric field such that their long axes are perpendicular to the field direction.

The cutouts 191-196 and 271-276 of the electrodes 190 and 270 and the edges of the pixel electrodes 190 distort the electric field to have a horizontal component that is substantially perpendicular to the edges of the cutouts 191-196 and 271-276 and the edges of the pixel electrodes 190. Accordingly, the LC molecules on each sub-area are tilt in a direction by the horizontal component and the azimuthal distribution of the tilt directions are localized to four directions, thereby increasing the viewing angle of the LCD.

In the meantime, the horizontal components generated by opposite edges of a cutout 191-196 or 271-275 are antiparallel and they may be nearly destructed. Accordingly, the tilt directions of the LC molecules 310 in the cutouts 191-196 and 271-275 are nearly random, thereby causing texture. A notch 277 of a cutout 271-276 generates a secondary horizontal component to determine the orientations of the LC molecules 310 disposed near the cutouts 271-276. For example, the LC molecules 310 disposed near a notch 277 in a cutout 271-276 tend to tilt in a direction perpendicular to an edge of the notch 277. Therefore, the LC molecules 310 in the cutouts 271-276 can tilt in a direction determined by the notches 277 and the texture may be reduced.

At least one of the cutouts 191-196 and 271-276 can be substituted with protrusions or depressions made of organic or inorganic material and the notches 277 can be also provided at the protrusions and the depressions.

The shapes and the arrangements of the cutouts 191-196 and 271-276 and the notches 277 may be modified.

FIGS. 5A-5D illustrate various shapes of the notches shown in FIGS. 2 and 3.

Referring to FIGS. 5A-5D, the notches 277 are triangular, rectangular, trapezoidal, or semicircular and they are convex or concave. As described above, the LC molecules 310 near the notches 277 are aligned such that their long axes are perpendicular to edges of the notches 277 and almost all the LC molecules in the cutouts 271-276 exhibit stable alignment. Accordingly, width of the cutouts 271-276 can be remained in a range of about 8-10 microns.

Several notches 277 may be provided at one cutout 271-276 and the convex notches and the concave notches may be alternately arranged. The notches 277 may be provided either or both of the pixel electrodes 190 and the common electrode 270.

An LCD according to another embodiment of the present invention will be described in detail with reference to FIGS. 6 and 7.

Figure 6:
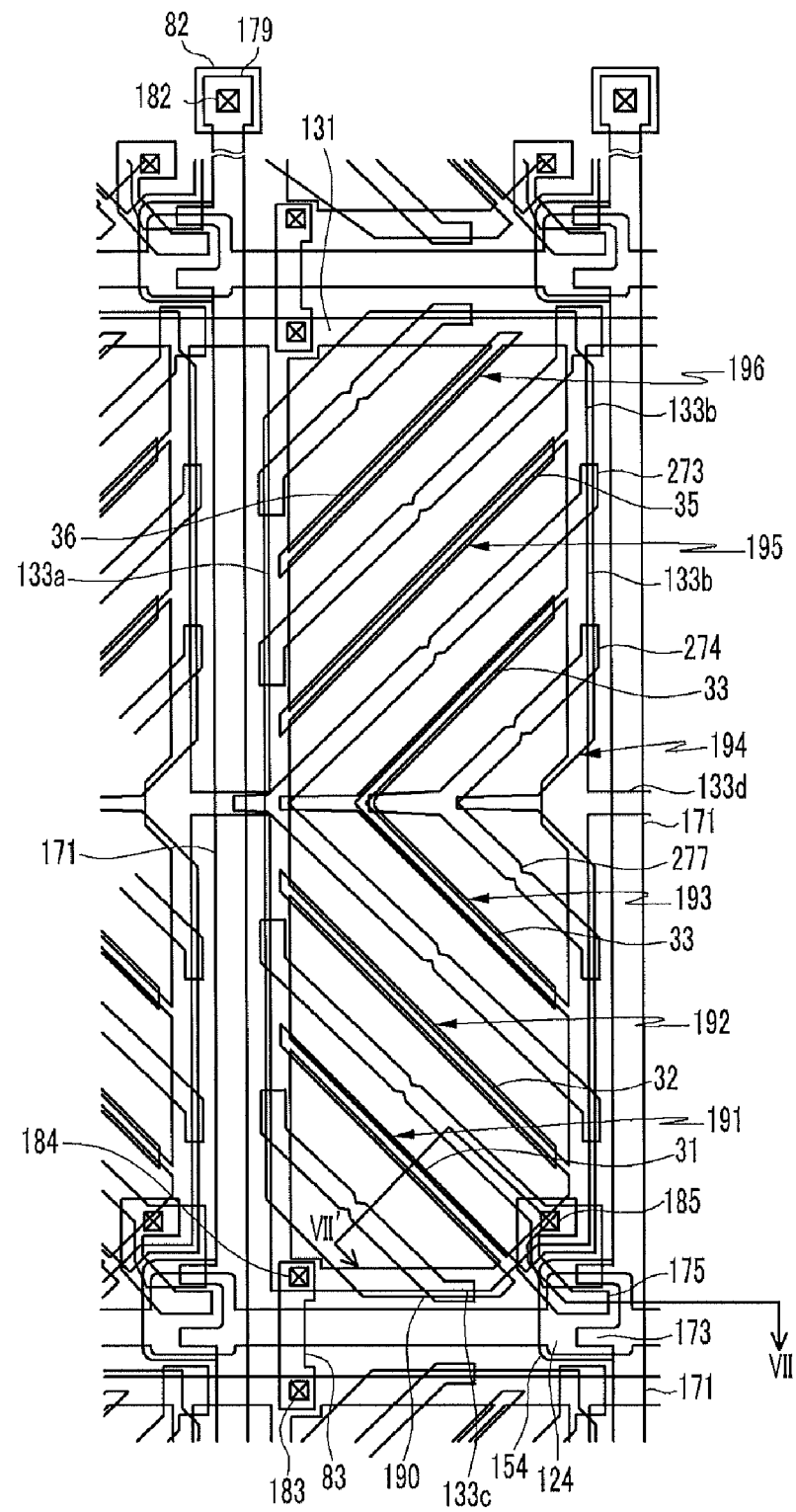
FIG. 6 is a layout view of an LCD according to another embodiment of the present invention.
Figure 7:
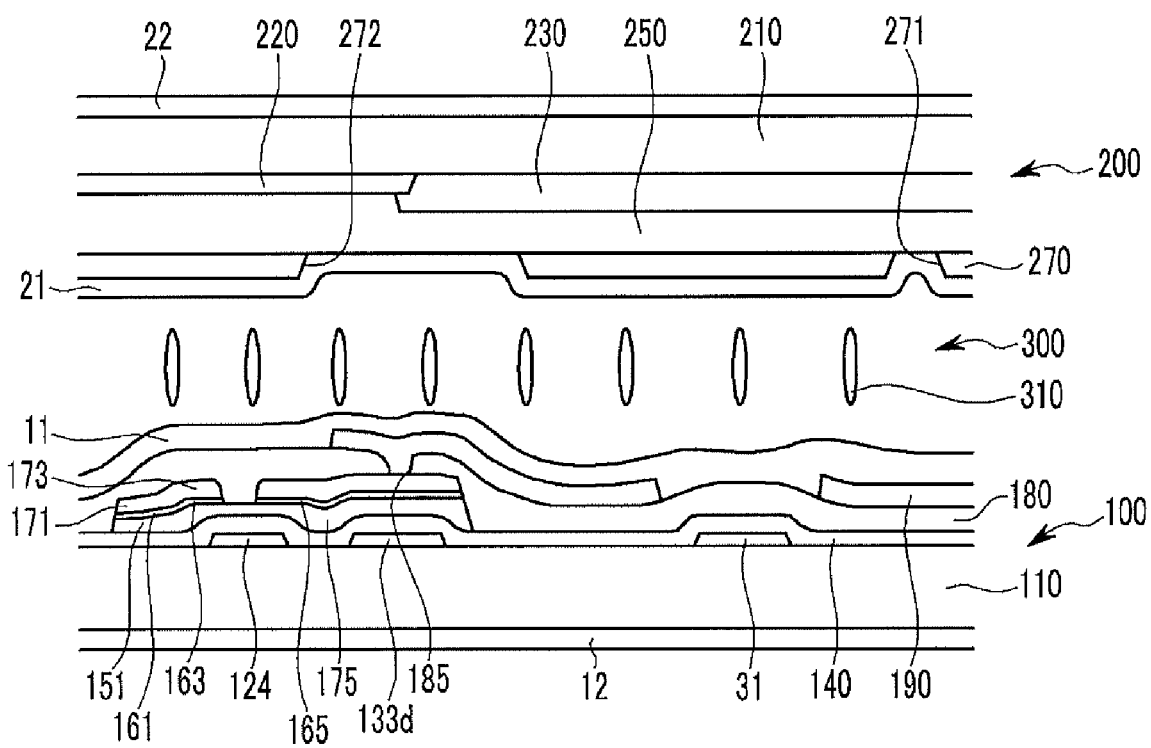
FIG. 7 is a sectional view of the LCD shown in FIG. 6 taken along the line VII-VII'.

FIG. 6 is a layout view of an LCD according to another embodiment of the present invention, and FIG. 7 is a sectional view of the LCD shown in FIG. 6 taken along the line VII-VII'.

Referring to FIGS. 6 and 7, an LCD according to this embodiment also includes a TFT array panel 100, a common electrode panel 200, and a LC layer 300 interposed therebetween. Layered structures of the panels 100 and 200 according to this embodiment are almost the same as those shown in FIGS. 1-4.

Regarding the TFT array panel 100, a plurality of gate lines 121 including a plurality of gate electrodes 124 and a plurality of storage electrode lines 131 including a plurality of ring-shaped branches 133*a*-133*c*, oblique branches 31-36, and connections 133*d* are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175, are formed on the ohmic contacts 161 and 165, and a passivation layer 180 are formed thereon. A plurality of contact holes 182 and 185 are provided at the passivation layer 180, and a plurality of pixel electrodes 190 and a plurality of contact assistants 82 are formed on the passivation layer 180. An alignment layer 11 and a polarizer 12 are disposed on inner and outer surfaces of the TFT array panel 100.

Regarding the common electrode panel 200, a light blocking member 220, a plurality of color filters 230, an overcoat 250, a common electrode 270 having cutouts 275-277 having notches 277, and an alignment layer 21 are formed on an insulating substrate 210. An alignment layer 21 and a polarizer 22 are disposed on inner and outer surfaces of the common electrode panel 200.

Different from the TFT array panel 100 shown in FIGS. 1, 3 and 4, the semiconductor stripes 151 of the TFT array panel 100 according to this embodiment have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

A manufacturing method of the TFT array panel 100 according to an embodiment simultaneously forms the data lines 171, the drain electrodes 175, the metal pieces 172, the semiconductors 151, and the ohmic contacts 161 and 165 using one photolithography process.

A photoresist pattern for the photolithography process has position-dependent thickness, and in particular, it has first and second portions with decreased thickness. The first portions are located on wire areas that will be occupied by the data lines 171, the drain electrodes 175, and the metal pieces 172 and the second portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

Many of the above-described features of the LCD shown in FIGS. 1-4 may be appropriate to the TFT array panel shown in FIGS. 6 and 7.

An LCD according to another embodiment of the present invention is described in detail with reference to FIGS. 8-11.

Figure 8:
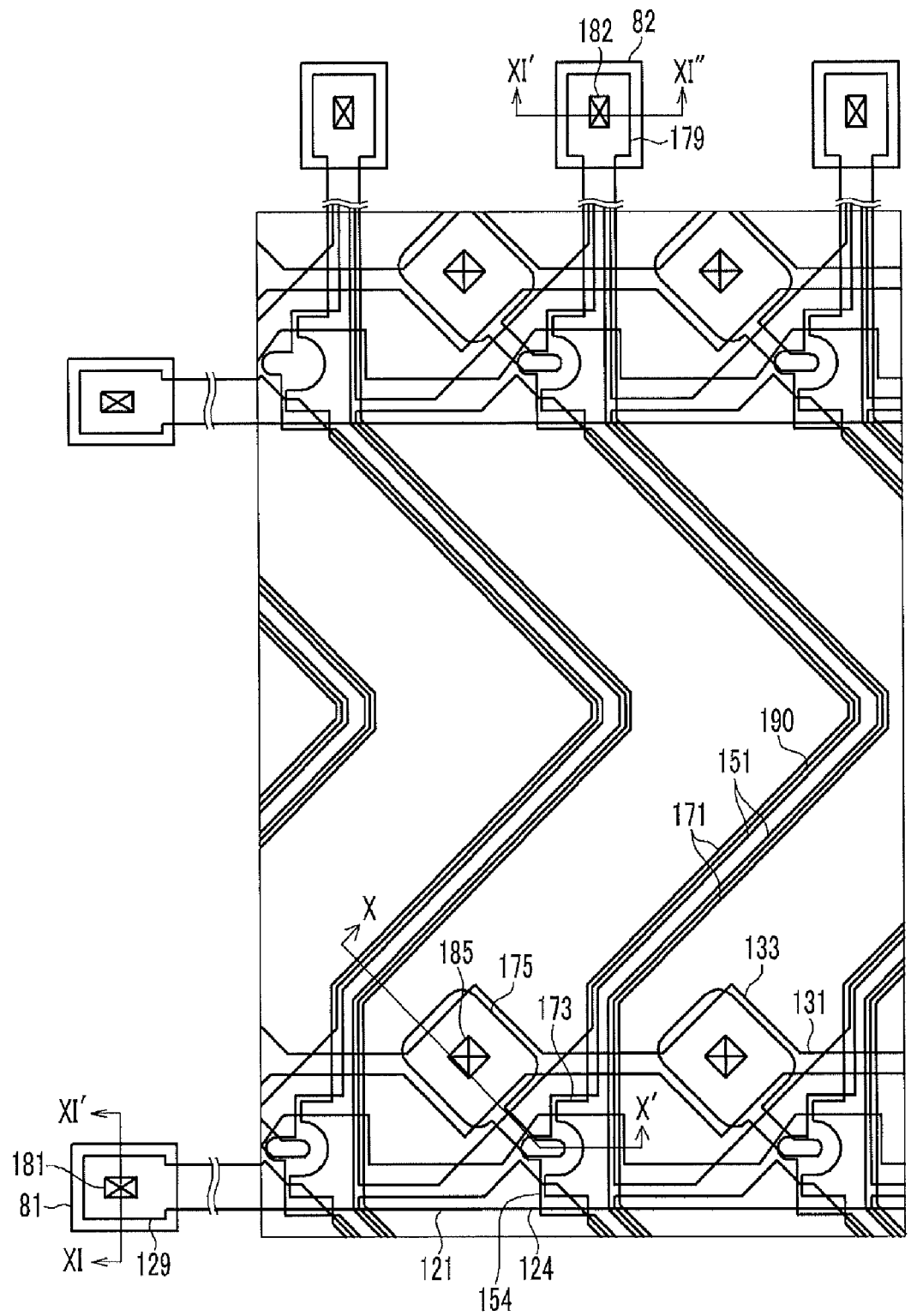
FIG. 8 is a layout view of a TFT array panel for an LCD according to an embodiment of the present invention.
Figure 9:
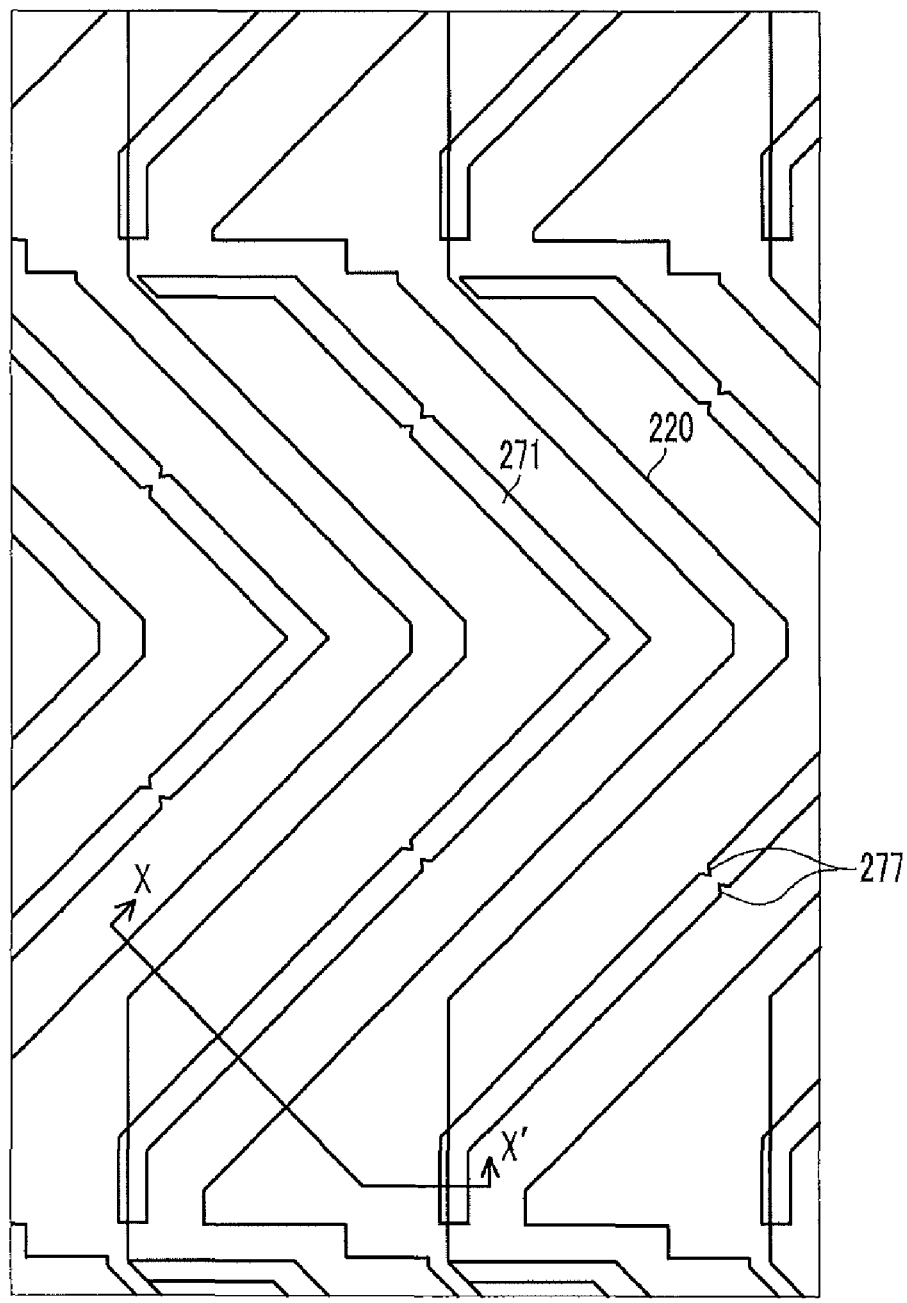
FIG. 9 is a layout view of a common electrode panel for an LCD according to an embodiment of the present invention.
Figure 10:
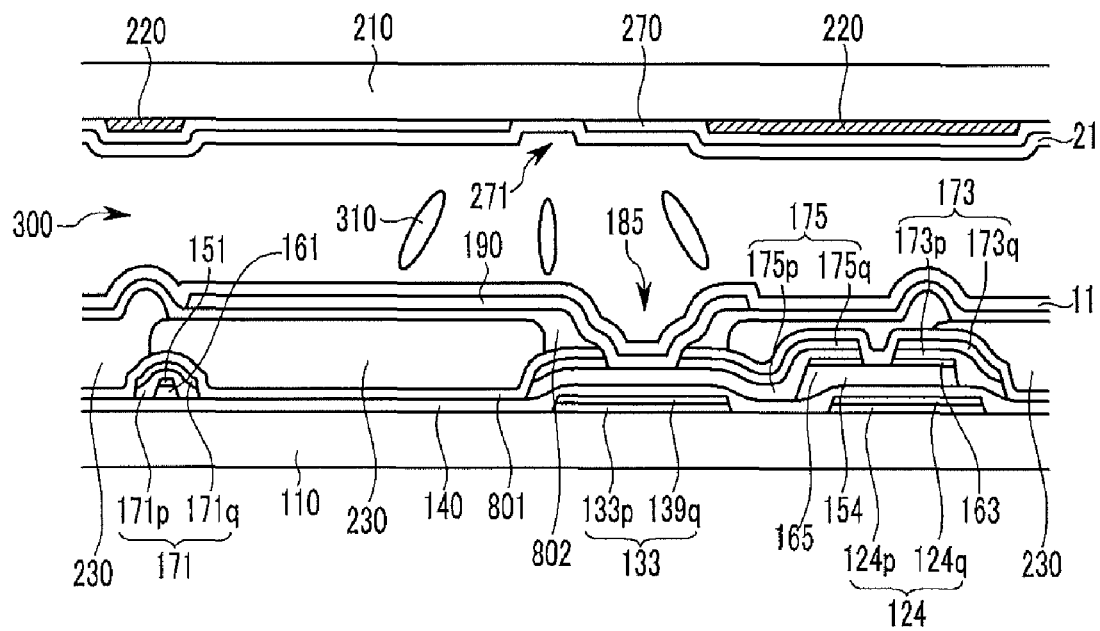
FIG. 10 is a sectional view of an LCD shown including the TFT array panel shown in FIG. 8 and the common electrode panel shown in FIG. 9 taken along the line X-X'.
Figure 11:
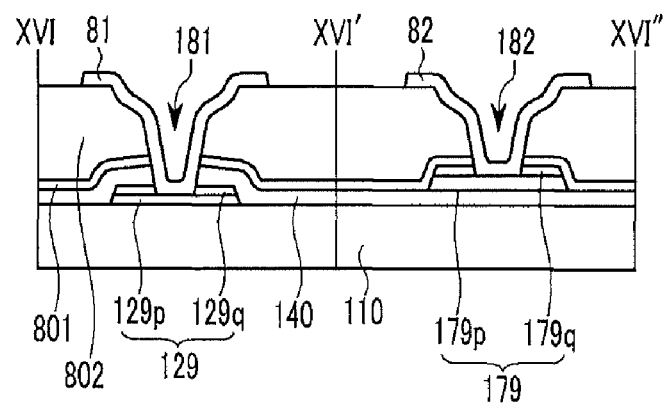
FIG. 11 is a sectional view of the LCD shown in FIG. 3 taken along the lines XI-XI' and XI'-XI".

FIG. 8 is a layout view of a TFT array panel for an LCD according to an embodiment of the present invention, FIG. 9 is a layout view of a common electrode panel for an LCD according to an embodiment of the present invention, FIG. 10 is a sectional view of an LCD shown including the TFT array panel shown in FIG. 8 and the common electrode panel shown in FIG. 9 taken along the line X-X', and FIG. 11 is a sectional view of the LCD shown in FIG. 3 taken along the lines XI-XI' and XI'-XI''.

An LCD according to this embodiment includes a TFT array panel 100, a common electrode panel 200 facing the TFT array panel 100, and a LC layer 300 interposed between the TFT array panel 100 and the common electrode panel 200.

The TFT array panel 100 is now described in detail with reference to FIGS. 8, 10 and 11.

A plurality of gate lines 121 and a plurality of storage electrode lines 131 are formed on an insulating substrate 110.

The gate lines 121 extend substantially in a transverse direction and are separated from each other. Each gate line 121 includes a plurality of projections forming a plurality of gate electrodes 124 and an end portion 129 having a large area for contact with another layer or an external device.

Each storage electrode line 131 extends substantially in the transverse direction and includes a plurality of projections forming storage electrodes 133. Each storage electrode 133 has a shape of a diamond or a rectangle rotated by about 45 degrees and it is located close to the lower of adjacent two of the gate lines 121. The storage electrode lines 131 are supplied with a predetermined voltage such as a common voltage, which is applied to a common electrode 270 on the common electrode panel 200 of the LCD.

The gate lines 121 and the storage electrode lines 131 have a double-layered structure including two films having different physical characteristics, a lower film and an upper film. The upper film is preferably made of low resistivity metal including Al containing metal such as Al and Al alloy, Ag containing metal such as Ag and Ag alloy, or Cu containing metal such as Cu and Cu alloy for reducing signal delay or voltage drop in the gate lines 121 and the storage electrode lines 131. On the other hand, the lower film is preferably made of material such as Cr, Mo, Mo alloy, Ta, or Ti, which has good physical, chemical, and electrical contact characteristics with other materials such as indium tin oxide (ITO) or indium zinc oxide (IZO). A good exemplary combination of the lower film material and the upper film material is Cr and Al—Nd alloy. In FIGS. 10 and 11, the lower and the upper films of the gate electrodes 124 are indicated by reference numerals 124$p$ and 124$q$, respectively, the lower and the upper films of the end portions 129 are indicated by reference numerals 129$p$ and 129$q$, respectively, and the lower and the upper films of the storage electrodes 133 are indicated by reference numerals 133$p$ and 133$q$, respectively. Portions of the upper film 129$q$ of the end portions 129 of the gate lines 121 are removed to expose the underlying portions of the lower films 129$p$.

Alternatively, the gate lines 121 and the storage electrode lines 131 may include an upper film having a good contact characteristic and a lower film having low resistivity and an example thereof is a Mo upper film and an Al lower film. Furthermore, the gate lines 121 and the storage electrode lines 131 may have a single layer structure preferably including Al containing metal, Ag containing metal, Cu containing metal, Mo containing metal, Cr, Ti or Ta or may include three or more layers.

In addition, the lateral sides of the gate lines 121 and the storage electrode lines 131 are inclined relative to a surface of the substrate 110, and the inclination angle thereof ranges about 30-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated as "a-Si") or polysilicon are formed on the gate insulating layer 140. Each semiconductor stripe 151 extends substantially in the longitudinal direction while it is curved periodically. Each semiconductor stripe 151 has a plurality of projections 154 branched out toward the gate electrodes 124.

A plurality of ohmic contact stripes and islands 161 and 165 preferably made of silicide or n+ hydrogenated a-Si heavily doped with n type impurity such as phosphorous (P) are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range between about 30-80 degrees.

A plurality of data lines 171 and a plurality of drain electrodes 175 separated from each other are formed on the ohmic contacts 161 and 165 and the gate insulating layer 140.

The data lines 171 for transmitting data voltages extend substantially in the longitudinal direction and intersect the gate lines 121 and the storage electrode lines 131. Each data line 171 has an end portion 179 having a large area for contact with another layer or an external device and it includes a plurality of pairs of oblique portions and a plurality of longitudinal portions such that it curves periodically. A pair of oblique portions are connected to each other to form a chevron and opposite ends of the pair of oblique portions are connected to respective longitudinal portions. The oblique portions of the data lines 171 make an angle of about 45 degrees with the gate lines 121, and the longitudinal portions cross over the gate electrodes 124. The length of a pair of oblique portions is about one to nine times the length of a longitudinal portion, that is, it occupies about 50-90 percents of the total length of the pair of oblique portions and the longitudinal portion.

Each longitudinal portion of the data lines 171 includes a plurality of branches, which project towards the gate electrodes 124 to form curved (like a crescent) source electrodes 173. Each drain electrode 175 includes a rectangular or rhombic expanded end portion, which has a large area for contact with another layer and overlaps a storage electrode 133, and another end portion partly enclose by a source electrode 173. The edges of the expansions of the drain electrode 175 are substantially parallel to the edges of the storage electrodes 133. Each set of a gate electrode 124, a source electrode 173, and a drain electrode 175 along with a projection 154 of a semiconductor stripe 151 form a TFT having a channel formed in the semiconductor projection 154 disposed between the source electrode 173 and the drain electrode 175.

The data lines 171 and the drain electrodes 175 also include a lower film 171*p* and 175*p* preferably made of refractory metal such as Cr, Mo, Ti, Ta, or alloys thereof and an upper film 171*q* and 175*q* located thereon and preferably made of Al containing metal, Ag containing metal, or Cu containing metal. In FIGS. 10 and 11, the lower and the upper films of the source electrodes 173 are indicated by reference numerals 173*p* and 173*q*, respectively, and the lower and the upper films of the end portions 179 of the data lines 171 are indicated by reference numerals 179*p* and 179*q*, respectively. Portion of the upper films 179*q* and 175*q* of the expansions 179 of the data lines 171 and the drain electrodes 175 are removed to expose the underlying portions of the lower films 179*p* and 175*p*.

Like the gate lines 121 and the storage electrode lines 131, the data lines 171 and the drain electrodes 175 have inclined lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween.

A lower passivation film 801 preferably made of silicon nitride or silicon oxide is formed on the data lines 171 and the drain electrodes 175, and exposed portions of the semiconductor stripes 151, which are not covered with the data lines 171 and the drain electrodes 175.

A plurality of color filter stripes 230 are formed on the lower passivation film 801. Each of the color filter stripes 230 are disposed substantially between adjacent two the data lines 171 and extends substantially in the longitudinal direction, while it curves periodically. The color filter stripes 230 have a plurality of openings at the drain electrodes 175 and they are not disposed on a peripheral area which is provided with the end portions 129 of the gate lines 121 and the end portions 179 of the data lines 171. Each of the color filter stripes 230 represents one of three primary colors such as red, green and blue and the colors are arranged in turn in the transverse direction. Adjacent two of the color filter stripes 230 representing different colors overlap each other to enhance the blocking of light leakage, but they may have coincident edges or may be spaced apart from each other. The overlapping portions of the color filter stripes 230 form hills extending along the data lines 171.

An upper passivation film 802 is formed on the color filter stripes 230 and one of the lower and the upper passivation films 801 and 802 may be omitted. The upper passivation film 802 is preferably made of photosensitive organic material having a good flatness characteristic or low dielectric insulating material such as a-Si:C:O and a-Si:O:F formed by plasma enhanced chemical vapor deposition (PECVD). However, the upper passivation film 802 may be also made of inorganic material. The upper insulating film 802 protrudes upward on the hills formed by the color filter stripes 230 such that the protrusions of the upper insulating layer 802 enhance the control of the tilt directions of the LC molecules 310 in the LC layer 300.

The passivation films 801 and 802 have a plurality of contact holes 182 and 185 exposing the end portions 179 of the data lines 171 and the drain electrodes 175, respectively, and the contact holes 185 is smaller than the openings of the color filter stripes 230. The passivation films 801 and 802 and the gate insulating layer 140 have a plurality of contact holes 182 exposing the end portions 129 of the gate lines 121. The sidewalls of the contact holes 181, 182 and 185 are inclined with an angle of about 30-85 degrees or have stepwise profiles.

A plurality of pixel electrodes 190 and a plurality of contact assistants 81 and 82, which are preferably made of ITO or IZO, are formed on the upper passivation film 802. Alternatively, the pixel electrodes 190 may be made of transparent conductive polymer, and, for a reflective LCD, the pixel electrodes 190 are made of opaque reflective metal such as Cr. In these cases, the contact assistants 81 and 82 may be made of material such as ITO or IZO different from the pixel electrodes 190.

Each pixel electrode 190 is located substantially in an area enclosed by the data lines 171 and the gate lines 121, and thus it also forms a chevron. The pixel electrodes 190 cover the storage electrode lines 131 including the storage electrodes 133 and the expansions of the drain electrodes 175 and have chamfered edges substantially parallel to edges of the storage electrodes 133 that are close to the chamfered edges.

The pixel electrodes 190 are physically and electrically connected to the drain electrodes 175 through the contact holes 185 such that the pixel electrodes 190 receive the data voltages from the drain electrodes 175.

The pixel electrodes 190 overlap the storage electrode lines 131 to form storage capacitors. The capacitances of the storage capacitors, i.e., the storage capacitances are increased by providing the projections (i.e., the storage electrodes 133) at the storage electrode lines 131, elongating the drain electrodes 175 connected to the pixel electrodes 190, and providing the expansions at the drain electrodes 175 overlapping the storage electrodes 133 of the storage electrode lines 131 for decreasing the distance between the terminals and increasing the overlapping areas.

The pixel electrodes 190 overlap the data lines 171 as well as the gate lines 121 to increase aperture ratio.

The contact assistants 81 and 82 are connected to the exposed end portions 129 of the gate lines 121 and the exposed end portions 179 of the data lines 171 through the contact holes 181 and 182, respectively. The contact assistants 81 and 82 protect the exposed portions 129 and 179 and complement the adhesiveness of the exposed portions 129 and 179 and external devices.

Finally, an alignment layer 11 that may be homeotropic is formed on the pixel electrodes 190 and the upper passivation film 802.

The description of the common electrode panel 200 follows with reference to FIGS. 9-11.

A light blocking member 220 is formed on an insulating substrate 210 such as transparent glass and it includes a plurality of oblique portions facing the oblique portions of the data lines 171 and a plurality of right-angled-triangular portions facing the TFTs and the longitudinal portions of the data lines 171 such that the light blocking member 220 prevents light leakage between the pixel electrodes 190 and defines open areas facing the pixel electrodes 190. Each of the triangular portions of the light blocking member 220 has a hypotenuse parallel to a chamfered edge of a pixel electrode 190.

A common electrode 270 preferably made of transparent conductive material such as ITO and IZO is formed on the light blocking member 220 and the substrate 210. The common electrode 270 is supplied with the common voltage and it has a plurality of chevron-like cutouts 271 having notches 277.

Each cutout 271 includes a pair of oblique portions connected to each other, a transverse portion connected to one of the oblique portions, and a longitudinal portion connected to the other of the oblique portions. The oblique portions of the cutout 271 extend substantially parallel to the oblique portions of the data lines 171 and face a pixel electrode 190 so that they may bisect the pixel electrode 190 into left and right halves. The transverse and the longitudinal portions of the cutout 271 are aligned with transverse and longitudinal edges of the pixel electrode 190, respectively, and they make obtuse angles with the oblique portions of the cutout 271. The cutouts 271 are provided for controlling the tilt directions of the LC molecules 310 in the LC layer 300 and preferably have a width in a range between about 9-12 microns. The cutouts 271 may be substituted with protrusions preferably made of organic material and preferably having width ranging about 5 microns to 10 microns.

An alignment layer 21 that may be homeotropic is coated on the common electrode 270.

A pair of polarizers (not shown) are provided on outer surfaces of the panels 100 and 200 such that their transmissive axes are crossed and one of the transmissive axes is parallel to the gate lines 121. One of the polarizers may be omitted when the LCD is a reflective LCD.

The LCD may further include at least one retardation film for compensating the retardation of the LC layer 300.

It is preferable that the LC layer 300 has negative dielectric anisotropy and it is subjected to a vertical alignment that the LC molecules 310 in the LC layer 300 are aligned such that their long axes are substantially vertical to the surfaces of the panels 100 and 200 in absence of electric field.

Upon application of the common voltage to the common electrode 270 and a data voltage to the pixel electrodes 190, a primary electric field substantially perpendicular to the surfaces of the panels 100 and 200 is generated. The LC molecules 310 tend to change their orientations in response to the electric field such that their long axes are perpendicular to the field direction. In the meantime, the cutouts 271 of the common electrode 270 and the edges of the pixel electrodes 190 distort the primary electric field to have a horizontal component which determines the tilt directions of the LC molecules 310. The horizontal component of the primary electric field is perpendicular to the edges of the cutouts 271 and the edges of the pixel electrodes 190.

Accordingly, four sub-regions having different tilt directions, which are partitioned by edges of a pixel electrode 190, a cutout 271 bisecting the pixel electrode 190, and an imaginary transverse center line passing through the meeting point of the oblique portions of the cutout 271, are formed in a pixel region of the LC layer 300, which are located on the pixel electrode 190. Each sub-region has two major edges defined by the cutout 271 and an oblique edge of the pixel electrode 190, respectively. The sub-regions are classified into a plurality of, preferably four, domains based on the tilt directions.

In the meantime, the direction of a secondary electric field due to the voltage difference between the pixel electrodes 190 is perpendicular to the edges of the cutouts 271. Accordingly, the field direction of the secondary electric field coincides with that of the horizontal component of the primary electric field. Consequently, the secondary electric field between the pixel electrodes 190 enhances the determination of the tilt directions of the LC molecules 310.

Since the LCD performs inversion such as dot inversion, column inversion, etc., adjacent pixel electrodes are supplied with data voltages having opposite polarity with respect to the common voltage and thus a secondary electric field between the adjacent pixel electrodes is almost always generated to enhance the stability of the domains.

Since the tilt directions of all domains make an angle of about 45 degrees with the gate lines 121, which are parallel to or perpendicular to the edges of the panels 100 and 200, and the 45-degree intersection of the tilt directions and the transmissive axes of the polarizers gives maximum transmittance, the polarizers can be attached such that the transmissive axes of the polarizers are parallel to or perpendicular to the edges of the panels 100 and 200 and it reduces the production cost.

The resistance increase of the data lines 171 due to the curving can be compensated by widening the data lines 171 since distortion of the electric field and increase of the parasitic capacitance due to the increase of the width of the data lines 171 can be compensated by increasing the size of the pixel electrodes 190 and by adapting a thick organic passivation film.

The LCD shown in FIGS. 8-11 can have several modifications.

For example, the pixel electrodes 190 as well as the common electrode 270 may have cutouts (not shown) for generating fringe field. Furthermore, the cutouts may be substituted with protrusions disposed on the common electrode 270 or the pixel electrodes 190.

The shapes and the arrangements of the cutouts 272 or the protrusions and the notches 277 may be varied depending on the design factors such as the size of pixels 190, the ratio of the transverse edges and the longitudinal edges of the pixel electrodes 190, the type and characteristics of the liquid crystal layer 300, and so on.

FIG. 12 to FIG. 20 are layout views of a liquid crystal display according to the fourth to twelfth exemplary embodiments of the present invention.

Figure 12:
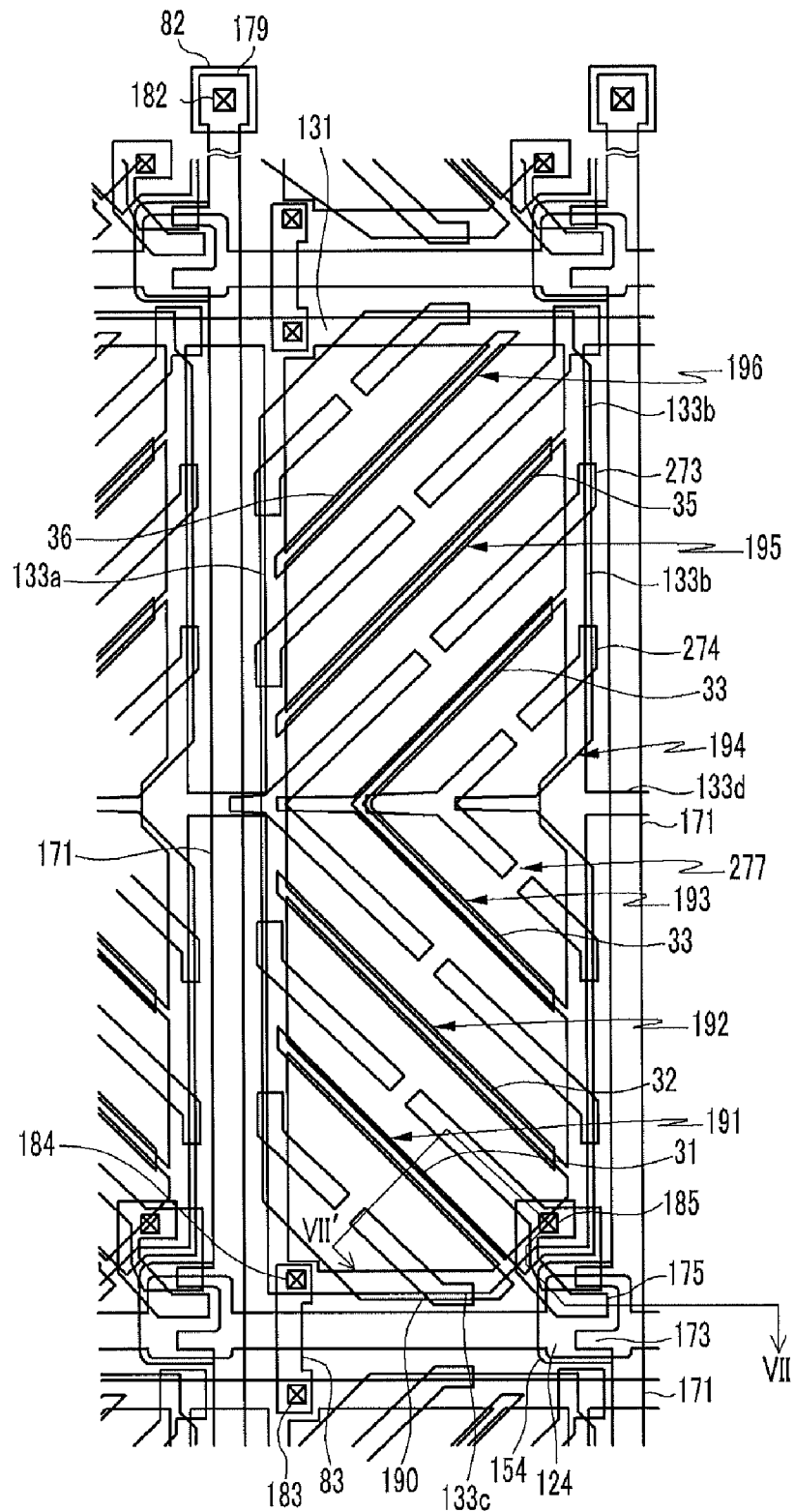
FIG. 12 to FIG. 20 are layout views of a liquid crystal display according to the fourth to thirteenth exemplary embodiments of the present invention.

Firstly, a liquid crystal display according to the fourth exemplary embodiment of the present invention will be described with reference to FIG. 12.

A liquid crystal display according to the fourth exemplary embodiment of the present invention includes notches 277 having a different shape from those of the liquid crystal display (referring to FIG. 6) according to the second exemplary embodiment. In the liquid crystal display according to the fourth exemplary embodiment, cutouts 271, 272, 273, 274, 275, and 276 are divided into two sides by the notches 277. That is, the conductive layer forming the common electrode 270 is not removed, but remain under the portion forming the notches 277 such that the notches 277 connect the portions of the common electrode 270 disposed on the both sides via the cutouts 271, 272, 273, 274, 275, and 276 to each other. When the cutouts 271, 272, 273, 274, 275, and 276 are replaced by an organic protrusion as the domain determination member, the portion forming the notches 277 becomes the portion where the organic protrusion does not exist. That is, the organic protrusion is disconnected on the portion of the notches 277.

These notches 277 function as a singular point in the region of the cutouts 271, 272, 273, 274, 275, and 276 such that the position to which the arrangement directions of the liquid crystal molecules are changed in the cutouts 271, 272, 273, 274, 275, and 276 is determined. Accordingly, the change of the image generated by the continued change of the arrangement of the liquid crystal molecules in the region of the cutouts 271, 272, 273, 274, 275, and 276 may be prevented.

Figure 13:
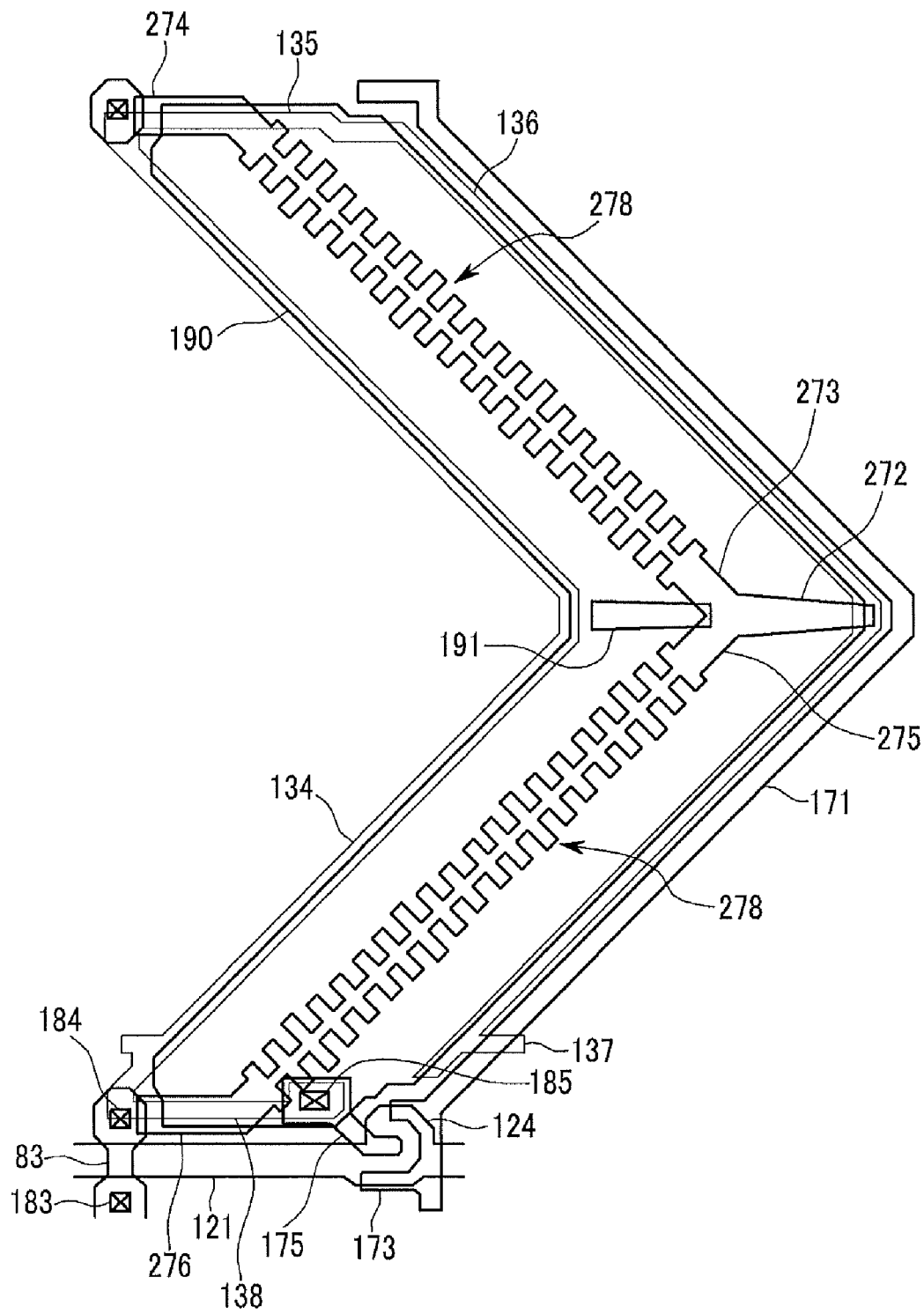

FIG. 13 is a layout view of a liquid crystal display according to the fifth exemplary embodiment of the present invention.

A thin film transistor array panel according to the fifth exemplary embodiment of the present invention will now be described in detail.

Gate lines 121 for transmitting gate signals extend in a transverse direction, and are separated from each other. Each gate line 121 includes a plurality of branches forming a plurality of gate electrodes 124.

Each storage electrode wiring set (134, 135, 136, 137, and 138) includes long edges 134 and 136 of a chevron shape, a connection short edge 135 connecting two long edges 134 and 136 in the same pixel and parallel to the gate line 121, a connection 137 connecting two long edges 134 and 136 of two neighboring pixels, and an isolated short edge 138 extending parallel to the gate line 121 from the long edge 134 and having a wide end portion. The storage electrode wiring set (134, 135, 136, 137, and 138) is applied with a predetermined voltage such as a common voltage. Here, two long edges 134 and 136 include a pair of oblique portions, and the oblique portions are connected to each other thereby forming the chevron shape, and forms 45 degrees from the gate line 121.

Semiconductor islands (not shown) made of a semiconductor such as hydrogenated amorphous silicon are formed on a gate insulating layer (not shown) covering the gate line 121 and the storage electrode wiring set (134, 135, 136, 137, and 138), and ohmic contacts (not shown) made of a material such as silicide or n+ hydrogenated amorphous silicon doped of n-type impurity with a high concentration are formed thereon. The structure of the gate insulating layer, the semiconductor islands, and the ohmic contacts may be seen in FIG. 10 and FIG. 11.

A plurality of data lines 171 and a plurality of drain electrodes 175 are formed on the ohmic contacts and the gate insulating layer.

The data lines 171 extend in a longitudinal direction thereby intersecting the gate line 121 and the connection 138 of the storage electrode wiring set (134, 135, 136, 137, and 138), and transmit data voltages. Each of the data lines 171 are repeatedly curved and include a pair of oblique portions and a plurality of longitudinal portions. The oblique portions forming a pair connected to each other form the chevron shape, and both ends thereof are connected to the longitudinal portion. The oblique portions of the data line 171 form an angle of 45 degrees from the gate lines 121, and the longitudinal portion intersects the gate lines 121.

Each drain electrode 175 overlaps the wide end portion 138 of the isolated short edge of the storage electrode wiring set (134, 135, 136, 137, and 138), the longitudinal portions of the data lines 171 respectively include a plurality of protrusions, and the longitudinal portions including the protrusions form source electrodes 173 enclosing the portions of the drain electrodes 175. A gate electrode 124, a source electrode 173, and a drain electrode 175 form a thin film transistor (TFT) along with the portion of the semiconductor, and the channel of the thin film transistor is formed in the semiconductor between the source electrode 173 and the drain electrode 175.

Here, the storage electrode wiring set (134, 135, 136, 137, and 138) has a shape enclosing the exterior of the pixel area defined by two neighboring data lines 171 and two neighboring gate lines 121.

A passivation layer (not shown) made of an inorganic insulating material such as silicon nitride or an organic insulating material such various resins is formed on the data lines 171 and the drain electrodes 175. The passivation layer may have a dual-layer structure including an inorganic layer and an organic layer.

A plurality of pixel electrodes 190 and a plurality of storage connection bridges 83 that are made of a transparent conductor such as ITO and IZO or a conductor having an excellent reflective characteristic such as Al are formed on the passivation layer 180, and the storage connection bridges 83 electrically connect the storage electrodes 134, 135, 136, 137, and 138 disposed on both sides of the gate lines 121 through contact holes 184 and 183 of the passivation layer and the gate insulating layer. The storage connection bridges 83 electrically connect the storage electrodes 134, 135, 136, 137, and 138 on the lower substrate 110 to each other. These storage electrodes 134, 135, 136, 137, and 138 may be used to repair defects of the gate lines 121 or the data lines 171.

Each pixel electrode 190 is disposed in the region enclosed by the data line 171 and the gate line 121 thereby forming the chevron shape, and has a cutout 191 parallel to the gate line 121 and disposed at the center of the chevron shape. The cutout 191 leans to the left long edge 134 of the storage electrodes 134, 135, 136, 137, and 138.

The pixel electrodes 190 are physically and electrically connected to the drain electrodes 175 through the contact holes 185, thereby receiving the data voltages. The pixel electrodes 190 applied with the data voltages generate the electric field along with the common electrode, thereby rearranging the liquid crystal molecules of the liquid crystal layer.

Next, a common electrode panel will be described.

The common electrode panel includes a black matrix (not shown) for preventing light leakage, and red, green, and blue color filters (not shown) formed in the openings of the black matrix and the common electrode (not shown).

The common electrode is made of a transparent conductive material such as ITO or IZO, and has a plurality of cutouts. Each cutout includes a central portion 272 disposed on the same line as the cutout 191 of the pixel electrode 190, oblique portions 273 and 275 extending upward and downward in the oblique direction from the central portion 272, and branch portions 274 and 276 extended from the ends of the oblique portions 273 and 275 in the direction parallel to the gate line 121. The boundaries of the oblique portions 273 and 275 form a plurality of protrusions and depressions 278, and the lengths of the protrusions and depressions 278 are increased and decreased in a predetermined period from the central portion 272 toward the branch portions 274 and 276. The branch portions 274 and 276 overlap the upper and lower short edges of the pixel electrode 190.

A liquid crystal layer (not shown) is formed between the thin film transistor array panel and the common electrode panel. The liquid crystal molecules of the liquid crystal layer are aligned such that the long axis of the liquid crystal molecules are perpendicular to the surfaces of two display panel, and the liquid crystal molecules have negative dielectric anisotropy.

Like the fifth exemplary embodiment of the present invention, when forming the pixel electrode 190 and the cutouts 272, 273, 275, 274, and 276, the direction of the secondary electric field that is additionally generated by the voltage difference between two neighboring pixel electrodes 190 is perpendicular to the edge of the cutout 271. Accordingly, the direction of the secondary electric field accords with the direction of the horizontal component of the main electric field. As a result, the secondary electric field between the pixel electrodes 190 enforces the inclination direction of the liquid crystal molecules.

Also, the boundaries of the oblique portions 273 and 275 form the protrusions and depressions 278 such that the liquid crystal molecules in the region of the cutouts 272, 273, 275, 274, and 276 may be controlled to have a uniform arrangement. Therefore, the change of the image generated by the continue change of the arrangement of the liquid crystal molecules in the region of the cutouts 272, 273, 274, 275, and 276 may be prevented.

The inclination of the liquid crystal molecules may be controlled by a plurality of protrusions formed on the common electrode 270 such that the cutouts 272, 273, 275, 274, and 276 may be replaced by organic protrusions.

Figure 14:
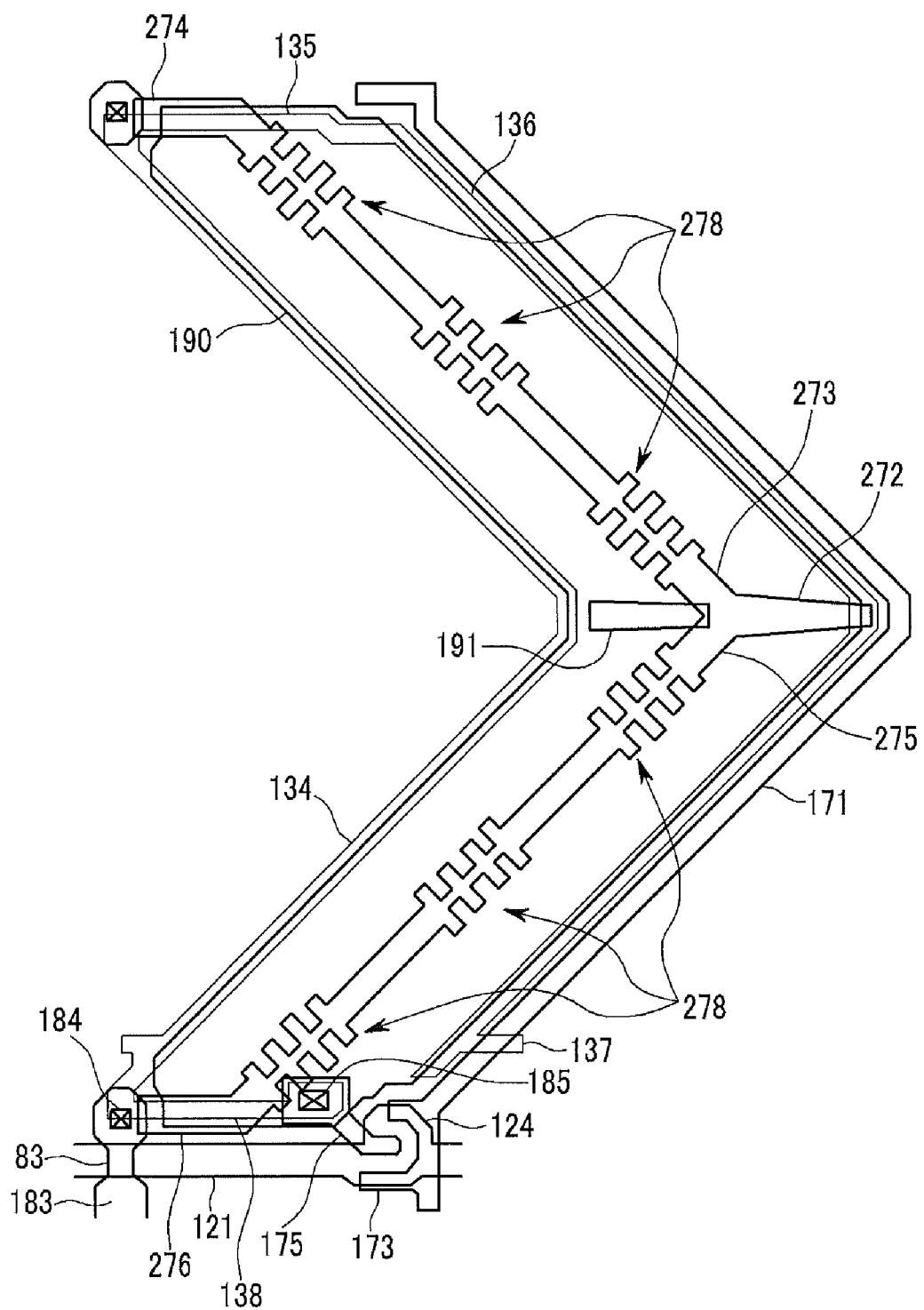

FIG. 14 is a layout view of a liquid crystal display according to the sixth exemplary embodiment of the present invention.

A liquid crystal display according to the sixth exemplary embodiment of the present invention includes cutouts 272, 273, 275, 274, and 276 of a common electrode having a different shape from the liquid crystal display (referring to FIG. 13) of the fifth exemplary embodiment. Particularly, the protrusions and depressions 278 of the oblique portions 273 and 275 are intermittently formed. The intermittent protrusions and depressions 278 function as singular points such that the arrangement of the liquid crystal molecules may be uniformly controlled.

Figure 15:
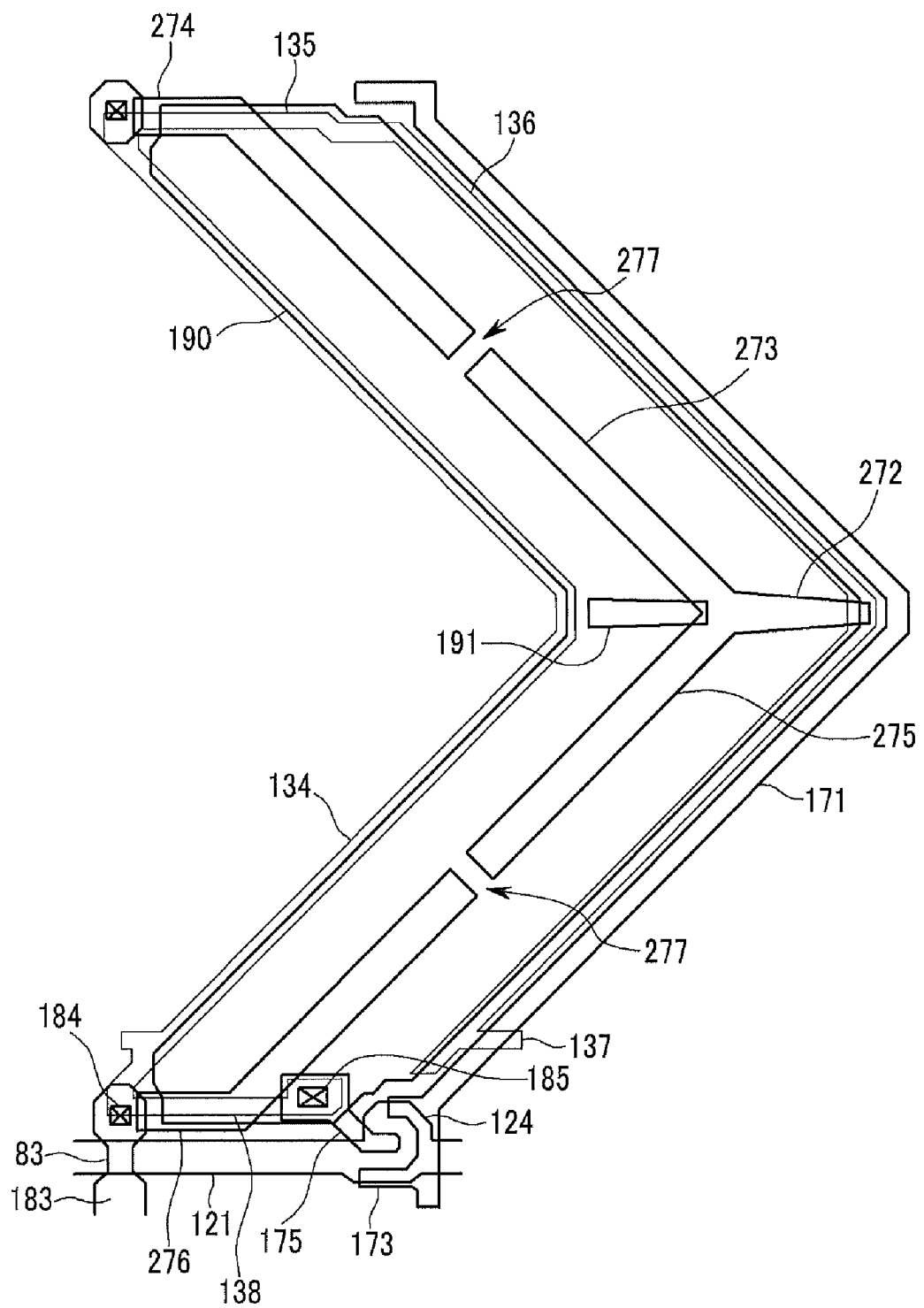

FIG. 15 is a layout view of a liquid crystal display according to the seventh exemplary embodiment of the present invention.

A liquid crystal display according to the seventh exemplary embodiment of the present invention includes cutouts 272, 273, 275, 274, and 276 of a common electrode having a different shape from the liquid crystal display (referring to FIG. 13) of the fifth exemplary embodiment. That is, the oblique portions 273 and 275 have notches 277 crossing the oblique portions 273 and 275 to replace the protrusions and depressions. The notches 277 function as the singular points such that the arrangement of the liquid crystal molecules may be uniformly controlled.

Figure 16:
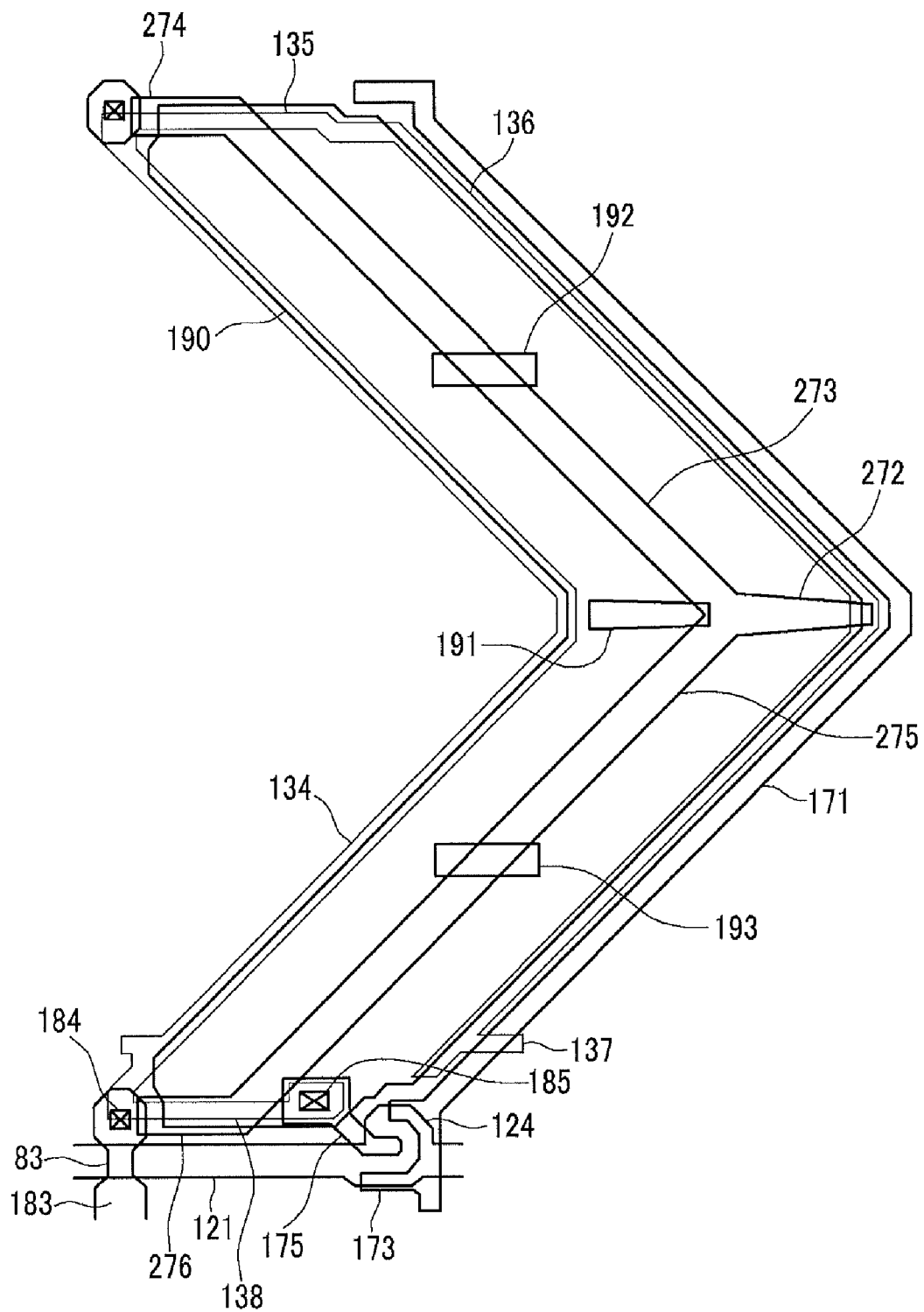

FIG. 16 is a layout view of a liquid crystal display according to the eighth exemplary embodiment of the present invention.

A liquid crystal display according to the eighth exemplary embodiment of the present invention includes cutouts 272, 273, 275, 274, and 276 of a common electrode and cutouts 191, 192, and 193 of a pixel electrode 190 having the different shape from the liquid crystal display (referring to FIG. 15) of the seventh exemplary embodiment. That is, the pixel electrode 190 has the cutouts 192 and 193 having the notch function instead of the notches 277. The cutouts 192 and 193 function as the singular point such that the arrangement of the liquid crystal molecules may be uniformly controlled. Here, the cutouts 192 and 193 may be replaced by an organic protrusion formed on the pixel electrode 190.

Figure 17:
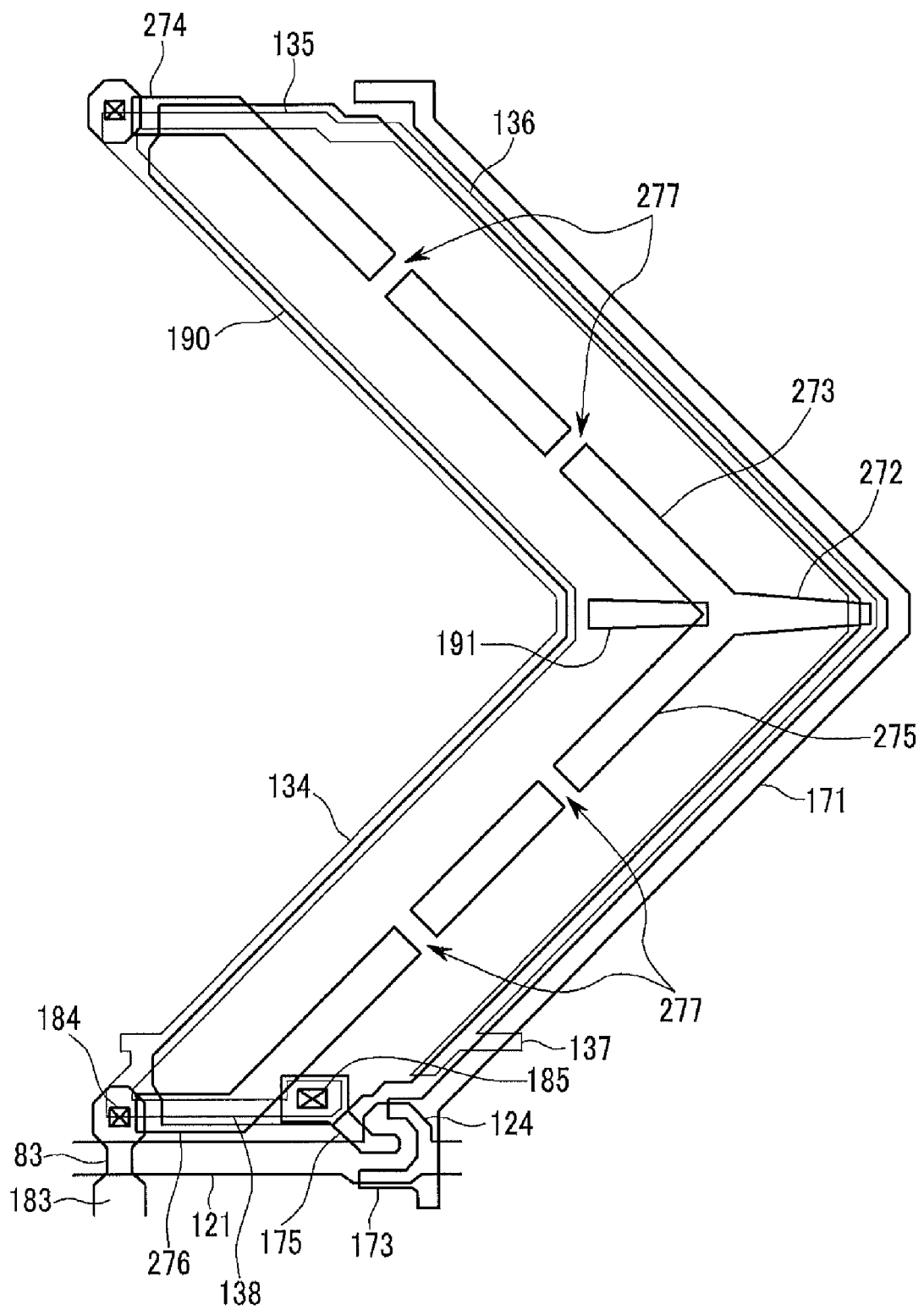

FIG. 17 is a layout view of a liquid crystal display according to the ninth exemplary embodiment of the present invention.

A liquid crystal display according to the ninth exemplary embodiment of the present invention includes the notches 277 of the oblique portions 273 and 275 of a different number and position from the liquid crystal display (referring to FIG. 15) of the seventh exemplary embodiment. The notches 277 crossing the oblique portions 273 and 275 are formed at positions dividing the oblique portions 273 and 275 into three equal parts respectively. The notches 277 function as the singular points such that the arrangement of the liquid crystal molecules may be uniformly controlled.

Figure 18:
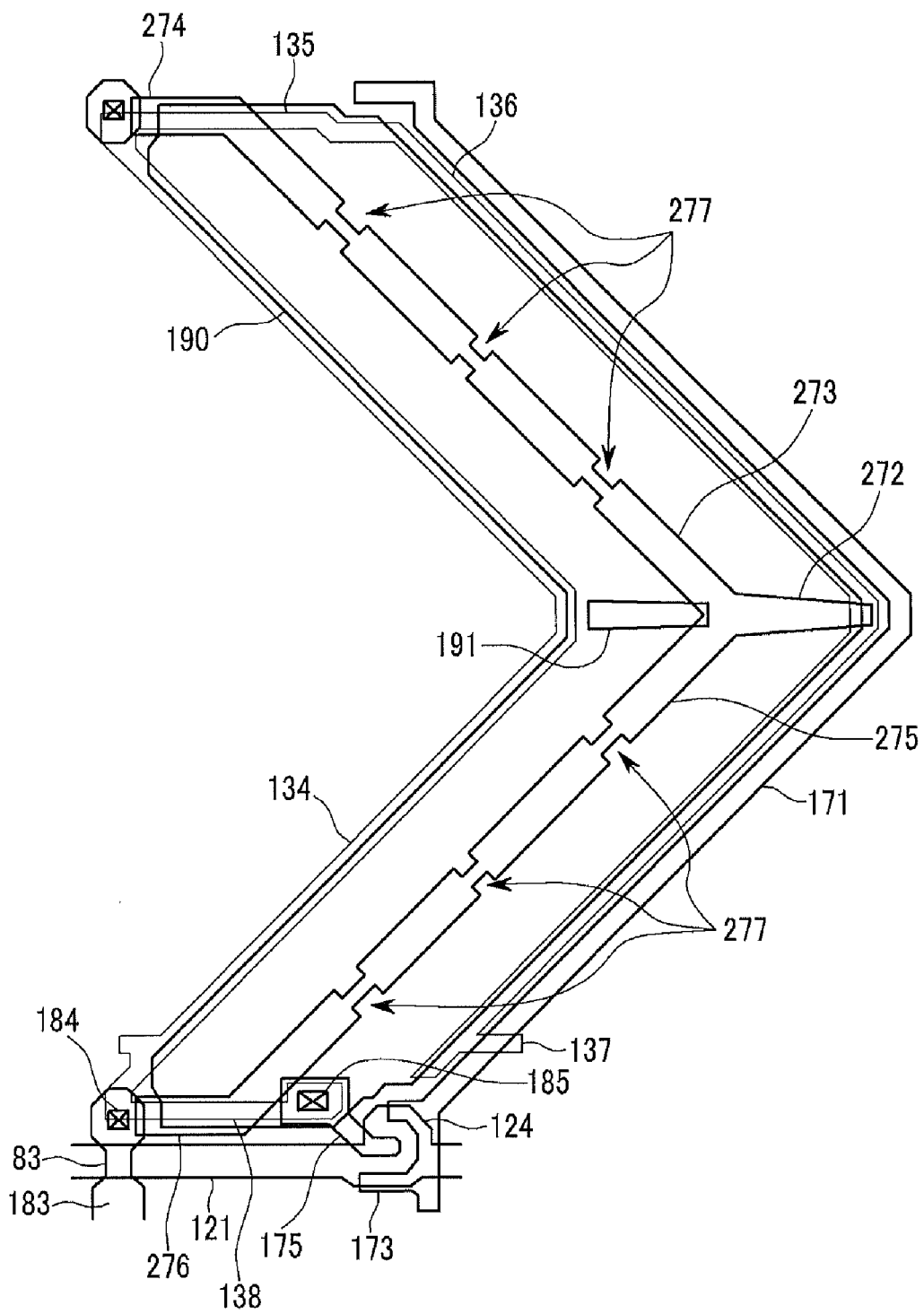

FIG. 18 is a layout view of a liquid crystal display according to the tenth exemplary embodiment of the present invention.

A liquid crystal display according to the tenth exemplary embodiment of the present invention includes the notches 277 of the oblique portions 273 and 275 of a different number, shape and position from the liquid crystal display (referring to FIG. 15) of the seventh exemplary embodiment. The notches 277 are formed at positions dividing the oblique portions 273 and 275 into four equal parts respectively, and the notches 277 make the oblique portions 273 and 275 slender instead of dividing the oblique portions 273 and 275. The notches 277 function as the singular points such that the arrangement of the liquid crystal molecules may be uniformly controlled.

Figure 19:
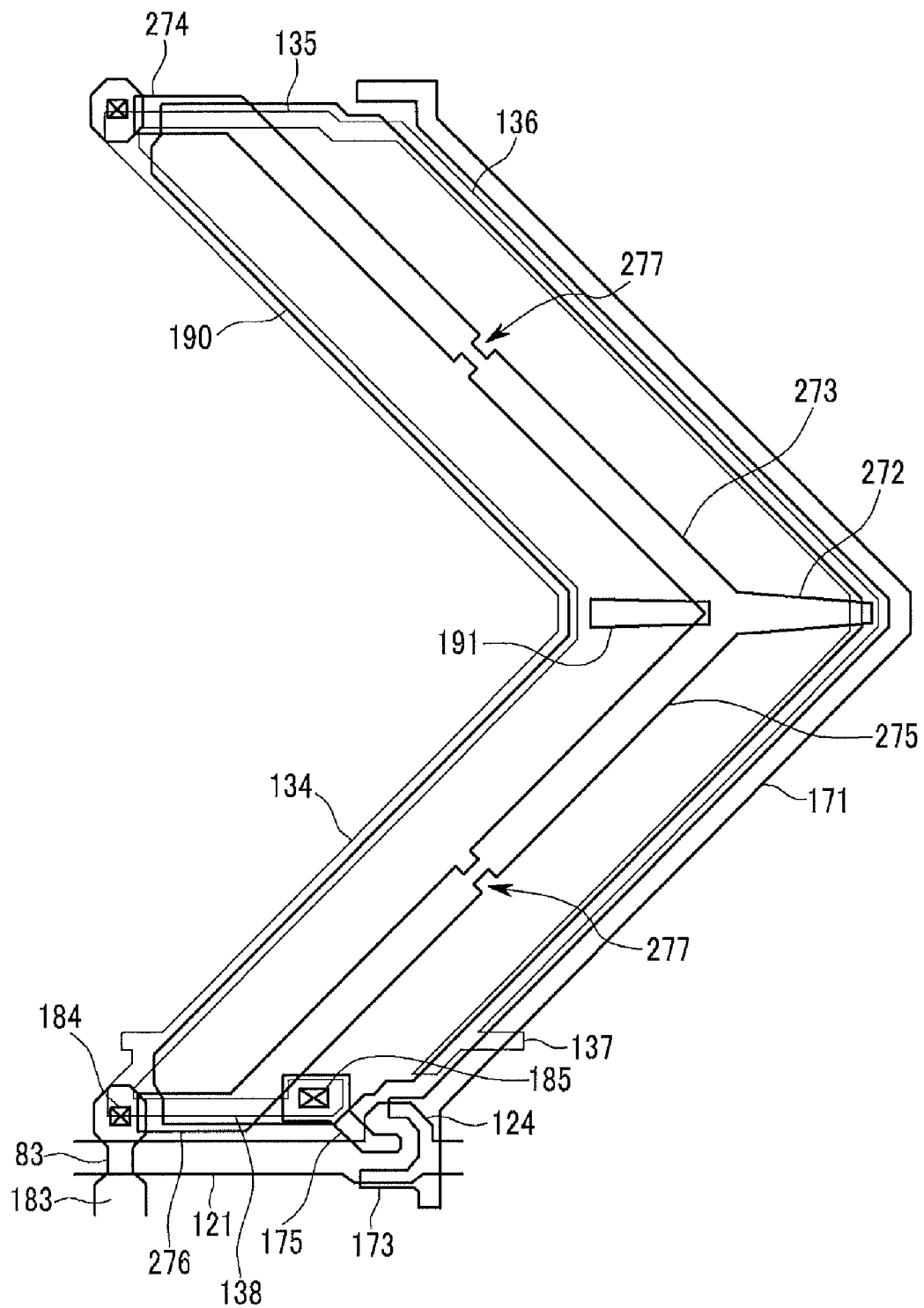

FIG. 19 is a layout view of a liquid crystal display according to the eleventh exemplary embodiment of the present invention.

A liquid crystal display according to the eleventh exemplary embodiment of the present invention includes the notches 277 of the oblique portions 273 and 275 of a different number and position from the liquid crystal display (referring to FIG. 18) of the tenth exemplary embodiment. The notches 277, which is the slender portion of the oblique portions 273 and 275 are formed at positions dividing the oblique portions 273 and 275 into two equal parts respectively. The notches 277 function as the singular points such that the arrangement of the liquid crystal molecules may be uniformly controlled.

Figure 20:
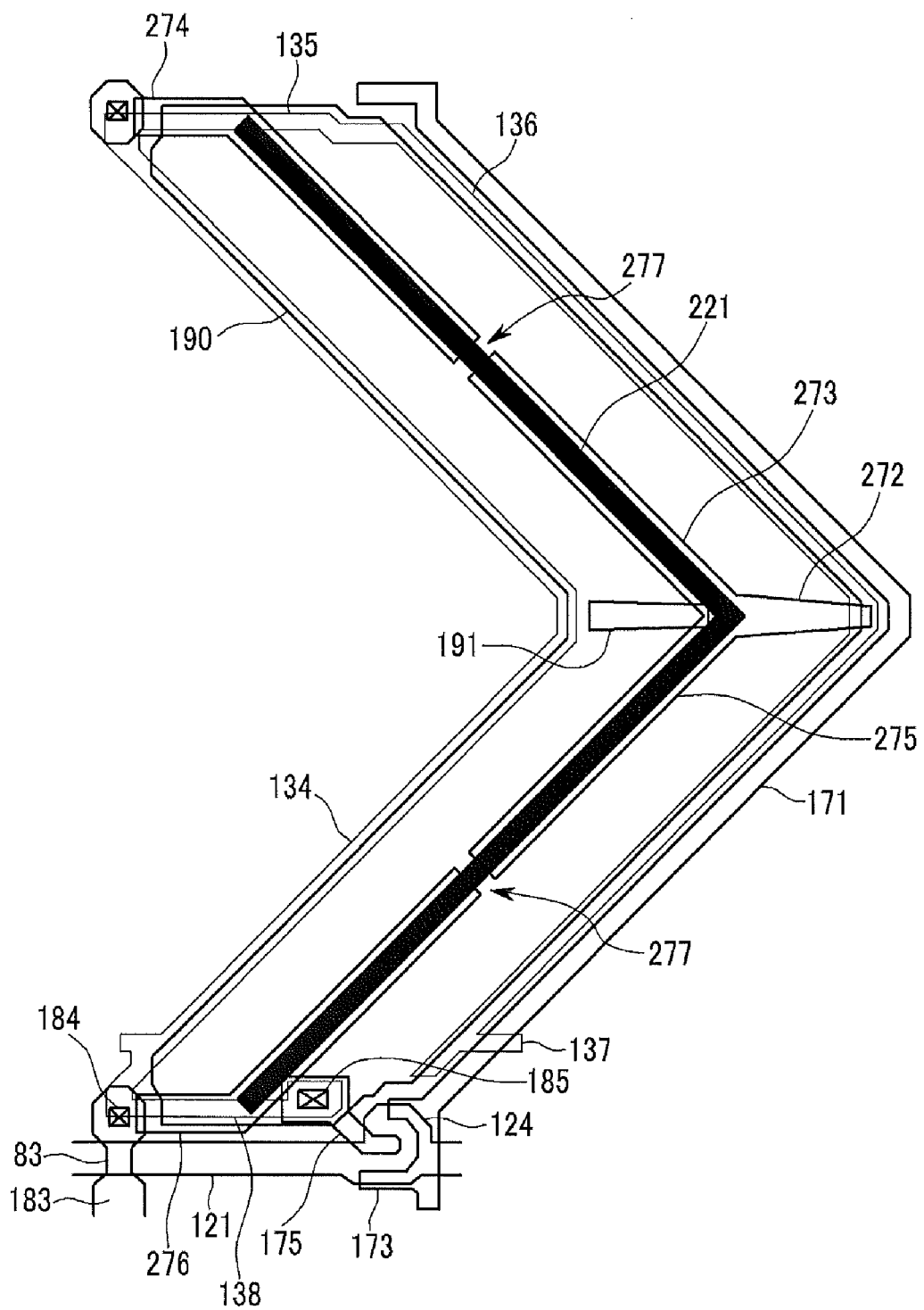

FIG. 20 is a layout view of a liquid crystal display according to the twelfth exemplary embodiment of the present invention.

A liquid crystal display according to the twelfth exemplary embodiment of the present invention includes an organic light blocking protrusion 221 overlapping the oblique portions 273 and 275, differently from the liquid crystal display (referring to FIG. 19) according to the eleventh exemplary embodiment. The organic light blocking protrusion 221 may be formed by coating a photoresist including black color pigments, exposing, and developing the photoresist and the organic blocking light protrusion 221 may be disposed on the thin film transistor array panel or the common electrode panel. The organic blocking light protrusion 221 blocks a change of the light amount that may be generated in the oblique portions 273 and 275.

In the fourth to twelfth exemplary embodiments, the color filter is disposed on the common electrode panel, like the third exemplary embodiment, and the color filter may be formed on the thin film transistor array panel.

While the present invention has been described in detail with reference to the preferred embodiments, those skilled in the art will appreciate that various modifications and substitutions can be made thereto without departing from the spirit and scope of the present invention as set forth in the appended claims.

What is claimed is:
1. A liquid crystal display comprising:
a first substrate;
a first signal line formed on the first substrate;
a second signal line formed on the first substrate and intersecting the first signal line;
a pixel electrode formed in a pixel defined by the intersection of the first signal line and the second signal line;

a thin film transistor connected to the first signal line, the second signal line, and the pixel electrode;
a second insulating substrate facing the first insulating substrate;
a common electrode formed on the second insulation substrate;
a liquid crystal layer formed between the first insulation substrate and the second insulation substrate; and
a domain determination member formed on at least one of the first insulating substrate and the second insulating substrate and dividing the liquid crystal molecules of the liquid crystal layer in the pixel into a plurality of domains,
wherein the domain determination member is divided into a plurality of portions by a notch, and
wherein the domain determination member includes a first portion extending in a direction parallel to the first signal line and a second portion extending in a direction parallel to the second signal line.

2. The liquid crystal display of claim 1, wherein:
the second signal line includes a curved portion, and the curved portion of the second signal line includes a first straight portion and a second straight portion; and
the first straight portion is inclined at a positive acute angle from the first signal line, and the second straight portion is inclined at a negative acute angle from the first signal line.

3. The liquid crystal display of claim 2, wherein
the first straight portion is inclined at an angle of substantially 45 degrees from the first signal line, and the second straight portion is inclined at an angle of substantially −45 degrees from the first signal line.

4. The liquid crystal display of claim 2, wherein
the domain determination member includes an oblique portion formed on the second insulation substrate and parallel to the curved portion of the second signal line.

5. The liquid crystal display of claim 4, wherein
the notch divides the oblique portion of the domain determination member.

6. The liquid crystal display of claim 5, further comprising
a light blocking member formed on one of the first insulating substrate and the second insulating substrate, and overlapping the oblique portion of the domain determination member.

7. The liquid crystal display of claim 6, wherein
the oblique portion of the domain determination member is disposed at a position dividing the pixel electrode into two equal parts.

8. The liquid crystal display of claim 2, further comprising
a storage electrode wiring set formed according to the circumference of the pixel area defined by the intersection of the first signal line and the second signal line.

9. The liquid crystal display of claim 1, wherein
the domain determination member is a cutout formed in the common electrode or the pixel electrode.

10. The liquid crystal display of claim 1, wherein
the domain determination member is a protrusion formed on the common electrode or the pixel electrode.

11. The liquid crystal display of claim 1, wherein
the notch is a cutout formed in the pixel electrode.

12. The liquid crystal display of claim 1, wherein
the notch is an organic protrusion formed on the pixel electrode.

13. The liquid crystal display of claim 1, further comprising
a color filter formed on the first substrate.

14. A liquid crystal display comprising:
a first substrate;
a first signal line formed on the first substrate;
a second signal line formed on the first substrate and intersecting the first signal line;
a thin film transistor connected to the first signal line and the second signal line;
a pixel electrode connected to the thin film transistor;
a second insulating substrate facing the first insulating substrate;
a common electrode formed on the second insulation substrate;
a liquid crystal layer formed between the first insulation substrate and the second insulation substrate; and
domain determination member formed on at least one of the first insulating substrate and the second insulating substrate and dividing liquid crystal molecules of the liquid crystal layer in the pixel into a plurality of domains,
wherein the domain determination member includes protrusions and depressions, and
wherein the domain determination member includes a first portion extending in a direction parallel to the first signal line and a second portion extending in a direction parallel to the second signal line.

15. The liquid crystal display of claim 14, wherein
the second signal line includes a curved portion, wherein the curved portion of the second signal line includes a first straight portion and a second straight portion, the first straight portion is inclined at a positive acute angle from the first signal line, and the second straight portion is inclined at a negative acute angle from the first signal line, and the domain determination member includes an oblique portion formed on the second insulation substrate and parallel to the curved portion of the second signal line.

16. The liquid crystal display of claim 15, wherein
the first straight portion is inclined at an angle of substantially 45 degrees from the first signal line, and the second straight portion is inclined at an angle of substantially −45 degrees from the first signal line.

17. The liquid crystal display of claim 15, wherein
the protrusions and depressions are included to the oblique portion.

18. The liquid crystal display of claim 17, wherein
the protrusions and depressions are intermittently formed in the oblique portion.

19. The liquid crystal display of claim 18, wherein
the domain determination member is a cutout of the common electrode or the pixel electrode.

20. A liquid crystal display comprising:
a first substrate;
a first signal line formed on the first substrate;
a second signal line formed on the first substrate and intersecting the first signal line;
a pixel electrode formed in the pixel defined by the intersection of the first signal line and the second signal line;
a thin film transistor connected to the first signal line, the second signal line, and the pixel electrode;
a second insulating substrate facing the first insulating substrate;
a common electrode formed on the second insulation substrate;
a liquid crystal layer formed between the first insulation substrate and the second insulation substrate; and
domain determination member formed on at least one of the first insulating substrate and the second insulating substrate and dividing liquid crystal molecules of the liquid crystal layer in the pixel into a plurality of domains, wherein the second signal line includes a curved portion, and the curved portion of the second signal line includes at least two straight portions, the straight portion is inclined from the first signal line, the domain determination member includes an oblique portion formed on the second insulation substrate and parallel to the curved portion of the second signal line, and the oblique portion includes a plurality of protrusions and depressions, and wherein the domain determination member includes a first portion extending in a direction parallel to the first signal line and a second portion extending in a direction parallel to the second signal line.

* * * * *